US010853840B2

(12) United States Patent
Modarresi et al.

(10) Patent No.: US 10,853,840 B2
(45) Date of Patent: Dec. 1, 2020

(54) PERFORMANCE-BASED DIGITAL CONTENT DELIVERY IN A DIGITAL MEDIUM ENVIRONMENT

(71) Applicant: Adobe Inc., San Jose, CA (US)

(72) Inventors: Kourosh Modarresi, Santa Clara, CA (US); Khashayar Khosravi, Stanford, CA (US)

(73) Assignee: Adobe Inc., San Jose, CA (US)

( * ) Notice: Subject to any disclaimer, the term of this patent is extended or adjusted under 35 U.S.C. 154(b) by 72 days.

(21) Appl. No.: 15/667,558

(22) Filed: Aug. 2, 2017

(65) Prior Publication Data

US 2019/0043077 A1 Feb. 7, 2019

(51) Int. Cl.
*G06Q 30/02* (2012.01)
(52) U.S. Cl.
CPC ..... *G06Q 30/0244* (2013.01); *G06Q 30/0254* (2013.01); *G06Q 30/0255* (2013.01)
(58) Field of Classification Search
CPC ........... G06Q 30/0244; G06Q 30/0249; G06Q 30/0254; G06Q 30/0255
USPC ...................................... 705/14.43
See application file for complete search history.

(56) References Cited

U.S. PATENT DOCUMENTS

| 8,849,975 | B2 | 9/2014 | Brayman |
| 10,699,294 | B2 | 6/2020 | Katariya et al. |
| 2003/0204368 | A1 | 10/2003 | Ertin et al. |
| 2010/0257146 | A1 | 10/2010 | Memon et al. |
| 2016/0077672 | A1 | 3/2016 | Anderson et al. |
| 2017/0323329 | A1 | 11/2017 | Katariya et al. |
| 2017/0323331 | A1 | 11/2017 | Malek et al. |
| 2018/0077250 | A1* | 3/2018 | Prasad ..................... H04L 67/22 |
| 2018/0129760 | A1 | 5/2018 | Kazerouni et al. |
| 2018/0219737 | A1* | 8/2018 | Schulz .................. H04L 41/147 |

FOREIGN PATENT DOCUMENTS

KR 20140037442 A * 3/2014

OTHER PUBLICATIONS

Graham Jackson, Dawn of the digital age and the evolution of the marketing mix, 2016 (Year: 2016).*

(Continued)

*Primary Examiner* — Tarek Elchanti
(74) *Attorney, Agent, or Firm* — SBMC

(57) ABSTRACT

Performance-based digital content delivery in a digital medium environment is described. Initially, different items of a collection of digital content are delivered to a substantially equal number of users. The collection is then iteratively tested to identify which content item achieves a desired action (e.g., conversion) at a highest rate. During the iterative test, data describing user interaction with the delivered content is collected. Based on the collected data, measures of achievement are determined for the different content items. Measures of statistical guarantee are also computed that indicate an estimated accuracy of the achievement measures. Responsive to determining that a condition for ending the test has not yet occurred, an optimized allocation is computed for delivery of the content by applying one of multiple allocation optimization techniques. The particular technique applied is based on the condition for ending the test and a type of statistical guarantee associated with the test.

20 Claims, 13 Drawing Sheets

(56) References Cited

OTHER PUBLICATIONS

"First Action Interview Office Action", U.S. Appl. No. 15/148,920, dated Oct. 15, 2018, 5 pages.
"First Action Interview Office Action", U.S. Appl. No. 15/148,390, dated Sep. 21, 2018, 6 pages.
"Pre-Interview First Office Action", U.S. Appl. No. 15/148,390, dated Aug. 27, 2018, 5 pages.
"Pre-interview First Office Action", U.S. Appl. No. 15/148,390, dated Aug. 31, 2018, 6 pages.
"Pre-Interview First Office Action", U.S. Appl. No. 15/148,920, dated Aug. 28, 2018, 5 pages.
Benjamini,"False discovery rate-adjusted multiple confidence intervals for selected parameters", Journal of the American Statistical Association, 100 (469), Jul. 15, 2012, 11 pages.
Farcomeni,"A Review of Modern Multiple Hypothesis Testing, with Particular Attention to the False Discovery Proportion", Statistical Methods in Medical Research 2008, Sep. 2007, pp. 347-388.
Miller,"Simple Sequential A/B Testing", https://www.evanmiller.org/sequential-ab-testing.html, Oct. 13, 2015, 14 pages.
"Final Office Action", U.S. Appl. No. 15/148,920, dated Apr. 17, 2019, 31 pages.
Pekelis,"Statistics for the Internet Age: The Story Behind Optimizely's New Stats Engine", Jan. 20, 2015, 9 pages.
"Non-Final Office Action", U.S. Appl. No. 15/148,920, dated Sep. 27, 2019, 38 pages.
"Notice of Allowance", U.S. Appl. No. 15/148,920, dated Mar. 24, 2020, 13 pages.
"Notice of Allowability", U.S. Appl. No. 15/148,920, dated May 20, 2020, 3 pages.
Naghshvar,"Active Sequential Hypothesis Testing", Dec. 18, 2013, 38 pages.
Richardson,"Multiple Multistage Hypothesis Tests: A Sequential Detection Approach to Target Tracking", Jun. 1992, 177 pages.
Song,"Asymptotically optimal, sequential, multiple testing procedures with prior information on the number of signals", Jul. 20, 2016, 30 pages.

\* cited by examiner

700

Algorithm 1: Known Horizon OptoAllocate Confidence Interval (OACI)

Input: $N$: the number of samples (known horizon),
$K$: number of samples drawn in each update,
$upd$: the optimization update period,
$\omega_{ini}$: the initial exploration weight,
$W$: the exploration weight update period,
$c_{upd}$: the exploration update coefficient,
$\omega_{min}$: minimum exploration weight,
$Ths$: the significance threshold,
$\alpha$: Coverage of confidence sets Initialize $N_i^{prev} = 0$, and $\hat{p}_i = \frac{1}{2}$ for $1 \le i \le k$, $\omega = \omega_{ini}$ while count $< N + 1$ do if count mod $W = 0$ and count $\ge 1$ then
  $\omega \leftarrow \min(c_{upd}\omega, \omega_{min})$
 end if
 if count mod $upd = 0$ then
  $\hat{p} \leftarrow \text{Sort}(\hat{p}, \text{ascending})$
  Solve the optimization problem in (4) and update $N_1, N_2, \ldots, N_k$
 end if
 Compute remaining samples required for each option and truncate to zero: $N_i^{rem} \leftarrow \max(N_i - N_i^{prev}, 0)$
 $\pi_{opt} \leftarrow \frac{1}{\sum_i N_i^{rem}}(N_1^{rem}, N_2^{rem}, \ldots, N_k^{rem})$ (Optimization probability vector)
 $\pi_{exp} \leftarrow \frac{1}{\sum_i 1/(N_i^{rem}+1)}(\frac{1}{N_1^{rem}+1}, \frac{1}{N_2^{rem}+1}, \ldots, \frac{1}{N_k^{rem}+1})$ (Exploration probability vector)
 Draw $K$ samples from the set $\{1, 2, \ldots, k\}$ according to the distribution $\pi = (\pi_{opt} + \omega\pi_{exp})/(1+\omega)$
 Observe the conversions for these $K$ samples
 Update $N_i^{prev}$, the vector of conversion rate $\hat{p}$, and count $\leftarrow$ count $+ K$ end while

Let $w = \text{argmax}_{i=1}^{k} \hat{p}_i$, winner $\leftarrow w$. Compute $t$-scores $t_{w,1}, t_{w,2}, \ldots, t_{w,w-1}, t_{w,w+1}, \ldots, t_{w,k}$ using (2) and let minTscore be the minimum of these scores
if minTscore $<$ Ths then
 isSignificant $\leftarrow 0$
 Error: the winner could not be found with the desired statistical significance.
else
 isSignificant $\leftarrow 1$
end if

Output: winner: The winner of test,
 isSignificant: Indicator of whether the result is statistically significant or not.

Algorithm 2 : Known Horizon OptoAllocate t-Scores (OATS)
Input: $N$: the number of samples (known horizon),
  $K$: number of samples drawn in each update,
  upd: the optimization update period,
  $w_{init}$: the initial exploration weight,
  $W$: the exploration weight update period,
  $c_{upd}$: the exploration update coefficient,
  $w_{min}$: minimum exploration weight
  Ths: the significance threshold
Initialize $N_i^{obs} = 0, \hat{p}_i = \frac{1}{k}$ for $1 \leq i \leq k$, and $w = w_{init}$
while count $< N + 1$ do
  if count mod $W = 0$ and count $\geq 1$ then
    $w \leftarrow \min(c_{upd} w, w_{min})$
  end if
  if count mod upd $= 0$ then
    $\hat{p} \leftarrow \text{Sort}(\hat{p}, \text{ascending})$
    Solve the optimization problem in (7) and update $N_1, N_2, \ldots, N_k$.
  end if
  Compute remaining samples required for each option and truncate to zero: $N_i^{rem} \leftarrow \max(N_i - N_i^{obs}, 0)$
  $x_{opt} \leftarrow \frac{1}{\sum_i N_i^{rem}}(N_1^{rem}, N_2^{rem}, \ldots, N_k^{rem})$ (Optimization probability vector)
  $x_{exp} \leftarrow \frac{1}{\sum_i 1/(\hat{p}_i+1)}(\frac{1}{\hat{p}_1+1}, \frac{1}{\hat{p}_2+1}, \ldots, \frac{1}{\hat{p}_k+1})$ (Exploration probability vector)
  Draw $K$ samples from the set $\{1, 2, \ldots, k\}$ according to the distribution $x = (x_{opt} + wx_{exp})/(1 + w)$
  Observe the conversions for these $K$ samples
  Update $N_i^{obs}$, the vector of conversion rate $\hat{p}$, and count $\leftarrow$ count $+ K$
end while
Let $w = \operatorname{argmax}_{1 \leq i \leq k} \hat{p}_i$, winner $\leftarrow w$. Compute t-scores $t_{w,1}, t_{w,2}, \ldots, t_{w,w-1}, t_{w,w+1}, \ldots, t_{w,k}$ using (2) and let minTscore be the minimum of these scores
if minTscore $<$ Ths then
  isSignificant $\leftarrow 0$
  Error: the winner could not be found with the desired statistical significance.
else
  isSignificant $\leftarrow 1$
end if
Output: winner: The winner of test,
  isSignificant: Indicator of whether the result is statistically significant or not.

```
Algorithm 3: Unknown Horizon OptoAllocate Confidence Interval (OACI)
Input:  K: number of samples drawn in each update.
        upd: the optimization update period and peeking period.
        w_{init}: the initial exploration weight.
        W: the exploration weight update period.
        c_{upd}: the exploration update coefficient.
        w_{min}: minimum exploration weight.
        Thr: the significance threshold.
        α: Coverage of confidence sets
Initialize N_i^{prev} = 0, minTscore = -∞, p̂_i = ½ for 1 ≤ i ≤ k, w = w_{init}
while minTscore < α and count ≠ 0 ( mod upd ) do
    if count mod W = 0 and count ≥ 1 then
        w ← min(c_{upd} w, w_{min})
    end if
    if count mod upd = 0 then
        p̂ ← Sort(p̂, ascending)
        Solve the optimization problem in (12) and update N_1, N_2, ..., N_k.
    end if
    Compute remaining samples required for each option and truncate to zero: N_i^{rem} ←
    max(N_i − N_i^{prev}, 0)
    π_{opt} ← ... (N_1^{rem}, N_2^{rem}, ..., N_k^{rem}) (Optimization probability vector)
    π_{exp} ← ... (Exploration probability vector)
    Draw K samples from the set {1, 2, ..., k} according to the distribution π = (π_{opt} +
    wπ_{exp})/(1 + w)
    Observe the conversions for these K samples
    Update N_i^{prev}, the vector of conversion rate p̂, and count ← count + K
    Let w = argmax_{i=1}^{k} p̂_i. Compute t-scores t_{w1}, t_{w2}, ..., t_{w,w-1}, t_{w,w+1}, ..., t_{wk} using (2)
    and let minTscore be the minimum of these scores.
end while
Let w = argmax_{i=1}^{k} p̂_i, winner ← w
Output: winner: The winner of test.
        count: Number of iterations.
```

Algorithm 4: Unknown Horizon OptoAllocate t-score(OATS)
Input: $K$: number of samples drawn in each update,
      upd: the optimization update period and peeking period,
      $w_{init}$: the initial exploration weight,
      $W$: the exploration weight update period,
      $c_{upd}$: the exploration update coefficient,
      $w_{min}$: minimum exploration weight,
      $\alpha$: The base t-score needed,
      $T\alpha$: the significance desired (in addition to $\alpha$)
Initialize $N_i^{seen} = 0$, minTscore $= -\infty$, $\hat{p}_i = \frac{1}{2}$ for $1 \le i \le k$, $w = w_{init}$
while minTscore $< \alpha$ and count $\neq 0$( mod upd ) do
    if count mod $W = 0$ and count $\ge 1$ then
        $w \leftarrow \min(c_{upd}w, w_{min})$
    end if
    if count mod upd $= 0$ then
        $\hat{p} \leftarrow \text{Sort}(\hat{p}, \text{ascending})$
        Solve the optimization problem in (11) and update $N_1, N_2, \ldots, N_k$.
    end if
    Compute remaining samples required for each option and truncate to zero: $N_i^{rem} \leftarrow \max(N_i - N_i^{seen}, 0)$
    $x_{opt} \leftarrow \frac{1}{\sum_{i=1}^k N_i^{rem}}(N_1^{rem}, N_2^{rem}, \ldots, N_k^{rem})$ (Optimization probability vector)
    $x_{exp} \leftarrow \frac{1}{\sum_{i=1}^k 1/(N_i^{rem}+1)}(\frac{1}{N_1^{rem}+1}, \frac{1}{N_2^{rem}+1}, \ldots, \frac{1}{N_k^{rem}+1})$ (Exploration probability vector)
    Draw $K$ samples from the set $\{1, 2, \ldots, k\}$ according to the distribution $x = (x_{opt} + wx_{exp})/(1+w)$
    Observe the conversions for these $K$ samples
    Update $N_i^{seen}$, the vector of conversion rate $\hat{p}$, and count $\leftarrow$ count $+ K$
    Let $w = \text{argmax}_{i=1}^k \hat{p}_i$. Compute t-scores $t_{w,1}, t_{w,2}, \ldots, t_{w,w-1}, t_{w,w+1}, \ldots, t_{w,k}$ using (2)
and let minTscore be the minimum of these scores.
end while
Let $w = \text{argmax}_{i=1}^k \hat{p}_i$, winner $\leftarrow w$
Output: winner: The winner of test,
        count: Number of iterations.

*Fig. 10*

PERFORMANCE-BASED DIGITAL CONTENT DELIVERY IN A DIGITAL MEDIUM ENVIRONMENT

BACKGROUND

In digital medium environments, many businesses deliver digital content to consumers to attempt to persuade them to purchase the products or services those businesses provide or engage the consumers with a desired experience. The act of consumers to follow through with a desired action—to purchase a product or service or to engage with a desired experience—is referred to as conversion. Examples of conversion include interaction of a consumer to engage with the digital content (e.g., click a link), purchase a product or service that pertains to the digital content, and so forth. A consumer, for instance, may navigate through webpages of a website of a service provider system. During this navigation, the consumer is exposed to an advertisement relating to the product or service. If the advertisement is of interest to the consumer, the consumer may select the advertisement through interaction with a computing device to navigate to webpages that contain more information about the product or service that is a subject of the advertisement, functionality usable to purchase the product or service, and so forth. Each of these selections thus involves conversion of interaction of the consumer via the computing device with respective digital content into other interactions with other digital content and/or even purchase of the product or service. Thus, configuration of the advertisements in a manner that is likely to be of interest to the consumers increases the likelihood of conversion of the consumers regarding the product or service.

In another example of digital content and conversion, a consumer may agree to receive emails or other electronic messages relating to products or services provided by the service provider system. The consumer, for instance, may opt-in to receive emails of marketing campaigns corresponding to a particular brand of product or service. Likewise, success in conversion of the consumers towards the product or service that is a subject of the emails directly depends on interaction of the consumers with the emails. Since this interaction is closely tied to a level of interest the consumer has with the emails, configuration of the emails also increases the likelihood of conversion of the consumers regarding the product or service.

Unique to advertising in the digital environment, the ability to digitally deliver targeted digital marketing content also allows an advertiser to instantaneously collect data regarding the consumer's interaction with the advertisement, and thus infer the success of the digital marketing content. To do so, testing techniques have been developed for a computing device to determine a likelihood of which options (e.g., items of digital content) are of interest to consumers and thus promote achievement of an action, e.g., conversion. An example of this is A/B testing, which involves comparison of two or more options, e.g., a baseline digital content option "A" and an alternative digital content option "B." In a digital marketing scenario, the two options include different digital marketing content such as advertisements having different offers, images, colors, fonts, and so forth. By way of example, digital content option "A" may specify 20% off this weekend and digital content option "B" may specify buy one/get one free today.

Digital content options "A" and "B" are then provided to different sets of consumers, e.g., using advertisements on a webpage, emails, and so on. Testing may then be performed by a computing device through use of a hypothesis. Hypothesis testing involves testing validity of a claim (i.e., a null hypothesis) by a computing device that is made about a population to reject or prove the claim. For example, a null hypothesis "$H_0$" may be defined in which conversion caused by the baseline (e.g., option "A") is equal to a conversion caused by the alternative (e.g., option "B"), i.e., "$H_0: A=B$". An alternative hypothesis "$H_1$" is also defined in which the conversion caused by the baseline is not equal to the conversion caused by the alternative, i.e., "$H_1: A \neq B$."

Based on the response from these consumers, a determination is made by the computing device to reject or not reject the null hypothesis. Rejection of the null hypothesis by the computing device indicates that a difference has been observed between the options, i.e., the null hypothesis that both options are equal is wrong. This rejection considers accuracy guarantees that Type I and/or Type II errors are minimized within a defined level of confidence, e.g., to ninety-five percent confidence that these errors do not occur. A Type I error "$\alpha$" is the probability of rejecting the null hypothesis when it is in fact correct, i.e., a "false positive." A Type II error "$\beta$" is the probability of not rejecting the null hypothesis when it is in fact incorrect, i.e., a "false negative." From this, a determination is made as to which of the digital content options are the "winner" based on a desired metric, e.g., conversion.

A common form of conventional digital marketing testing is referred to as fixed-horizon hypothesis testing. In fixed-horizon hypothesis testing, the test is "run" over a predefined number of samples (i.e., the "horizon") until it is completed. Fixed-horizon tests can also be based on other parameters, such as a desired confidence level or score indicative of an accuracy of the results. Input indicative of the predefined number of samples and the desired accuracy may be provided by a user, e.g., a marketer. For instance, a user can specify a number of users over which the test is to be run (e.g., delivery to 200,000 users), an amount of time over which the test is to be run (e.g., one week, which may correspond to an approximate number of users based on historic data), an amount of overall budget that can be consumed in connection with running the test (e.g., delivery to users until 10% of the campaign budget is spent), and so forth.

There are some drawbacks to hypothesis testing (e.g., fixed-horizon hypothesis testing), however. For example, hypothesis testing can involve equal allocation of the different available options, e.g., hypothesis testing involves delivering option "A" to a same number of users as option "B". Consequently, hypothesis testing can allocate many samples to options that have relatively small conversions. Consider an example in which there are five different options, rather than just two as in AB testing. A fixed-horizon hypothesis test involving the five different options may deliver digital content to users equally for the five different options. However, one or more of these options may convert at a significantly lower rate than other options. As a result, a marketer may continue to spend money delivering the lower-converting option to users—even though this money may generate more conversions if reallocated to deliver an option that is observed to be higher converting.

Another form of conventional digital marketing testing is referred to as multi-armed bandit testing. In a multi-armed bandit test, it is generally assumed that a user (e.g., a marketer) has a fixed budget, and the goal is to allocate portions of the budget among different digital content options in order to maximize conversion. Early during multi-armed bandit tests, there is no knowledge regarding which options are effective to cause conversions for users. As the test progresses, however, knowledge is gathered regarding options that are effective to cause conversion— and options that are not causing conversions. During multi-armed bandit tests, portions of the budget can be reallocated. For example, budget can be reallocated from relatively low converting options to relatively high converting options to "exploit" the higher converting options. In this way, more conversions may be obtained over the course of the test than if the budget remained evenly allocated. The tradeoff faced at each point when the budget can be reallocated is between "exploitation" of the option or options having higher conversion rates and "exploration" to gather more information about the expected conversion rates of the other options.

Consider an example in which one of the options has a low conversion rate at the beginning of the multi-armed bandit test due to some factor, such as by being delivered on a Sunday when this particular option may be more suited to delivery on Wednesdays through Saturdays. Moreover, assume that from Wednesday through Saturday the particular option is capable of converting at the highest rate among the options being tested. Assume also that the multi-armed bandit test is launched on a Sunday and budget is reallocated daily. If some amount of budget is not reserved for "exploration" throughout the week, e.g., by allocating at least some to the initially low-converting options, it will not be learned that the particular option is capable of generating high conversion rates later in the week.

Despite being capable of maximizing conversion over the course of a test, the multi-armed bandit approach also has drawbacks. For example, multi-armed bandit tests may not be capable of indicating a highest-converting option with a suitable (e.g., a statistically significant) amount of certainty. Consequently, assumptions made based on the results of such conventional digital marketing tests may be in error.

SUMMARY

To overcome these problems, performance-based digital content delivery is leveraged in a digital medium environment. Initially, a collection of different content (e.g., a digital marketing campaign) is delivered such that each different digital content item of the collection is delivered to a substantially equal number of users. The different items of content are then iteratively tested to identify which content item of the collection achieves a desired action (i.e., conversion) at a highest rate. During the iterative test, data describing user interaction with the delivered content is collected. Based on the collected data, measures of achievement are determined for the different content items. Measures of statistical guarantee are also computed that indicate an estimated accuracy of the achievement measures. Responsive to determining that a condition for ending the test has not yet occurred, an optimized allocation is computed for delivery of the content by applying one of multiple allocation optimization techniques. The particular technique applied is based on whether the condition for ending the test is fixed or unknown, and on a type of statistical guarantee associated with the test. The process of collecting the user interaction data, determining the measures of achievement and statistical guarantee, and computing the optimized allocations for content delivery are repeated until it is determined that the test ending condition occurs. At that point, the digital content of the collection that achieves the desired action is identified based on the measures of achievement.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 7 depicts an example technique for determining an optimized allocation of content deliveries for a test with a fixed duration using confidence measures.

FIG. 8 depicts an example technique for determining an optimized allocation of content deliveries for a test with a fixed duration using observed distribution scores.

FIG. 9 depicts an example technique for determining an optimized allocation of content deliveries for a test with an unknown duration using confidence measures.

FIG. 10 depicts an example technique for determining an optimized allocation of content deliveries for a test with an unknown duration using observed distribution scores.

DETAILED DESCRIPTION

Overview

Figure 1:
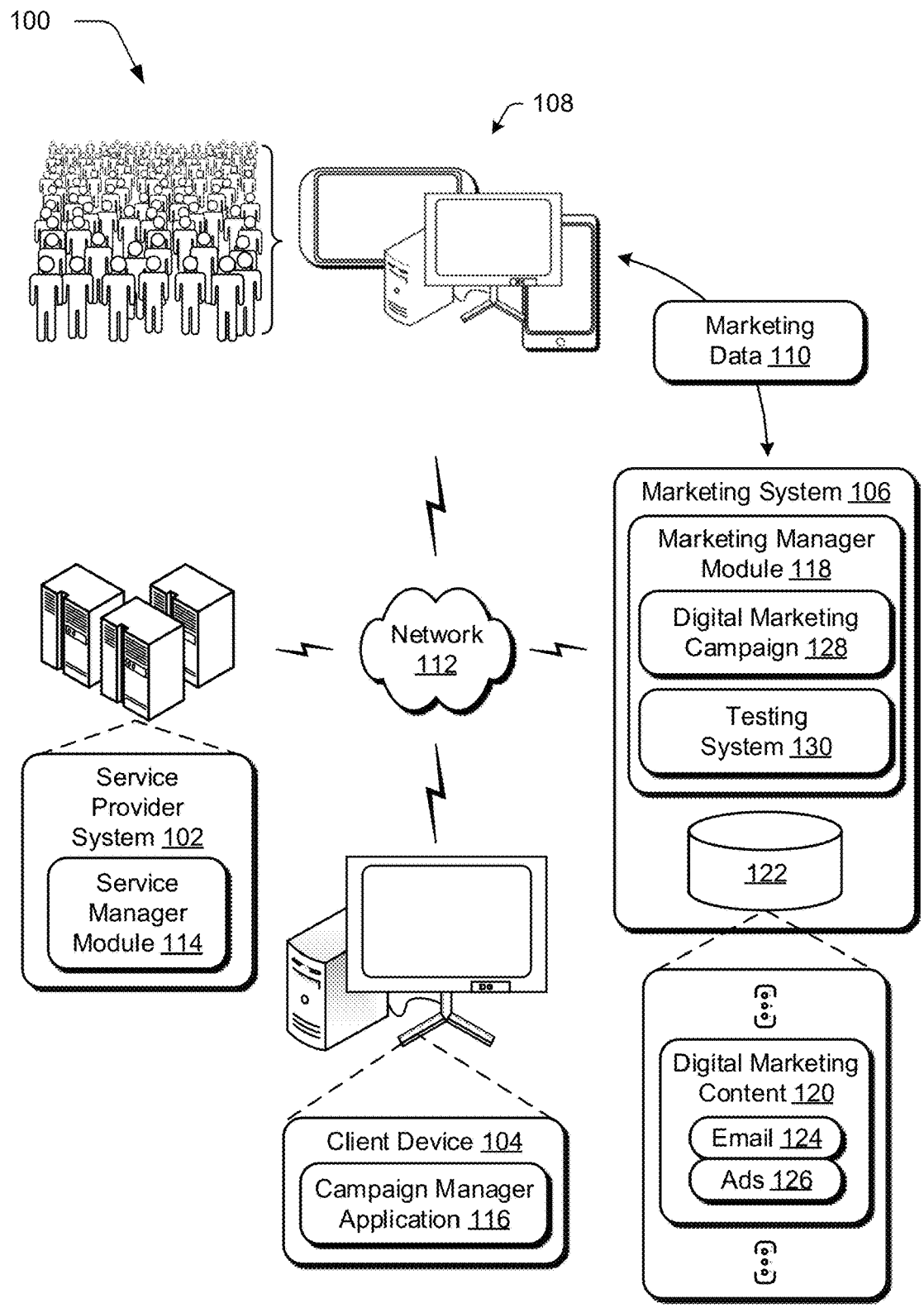
FIG. 1 is an illustration of an environment in an example implementation that is operable to employ techniques described herein.

Many businesses deliver targeted digital content to consumers to attempt to persuade them to engage in a desired experience or interaction, such as to purchase the products or services those businesses provide. In connection with this, many businesses test different items of a collection of digital content (e.g., a digital marketing campaign) to identify which items achieve a desired action. By way of example, testing the different items of digital content to identify an item or a couple items that achieve the desired action at a higher rate than other items of the collection may be desirable. In so doing, businesses may be able to more efficiently achieve business goals (e.g., higher profits) by allocating resources to the delivery of digital content that achieves a desired action at a higher rate—rather than continuing to allocate resources to the delivery of digital content that achieves the desired action at a lower rate, if at all.

Conventional techniques for digital marketing testing have a variety of drawbacks, however. Fixed-horizon hypothesis testing techniques, such as "A/B testing," involve delivering the different content items of a campaign to a substantially equal number of users over the course of the campaign. In doing so, though, these tests may fail to take advantage of the digital content items that achieve the desired action at relatively high rates. Instead, these techniques continue to deliver digital content items having a relatively low rate of achieving the desired action. Businesses may view this as a "waste" of their resources. Another form of conventional digital marketing testing is referred to as multi-armed bandit testing. In such tests, there is no knowledge early in the test regarding which content items are effective to cause conversions for users. As the test progresses, however, knowledge is gathered regarding content items that are effective to cause conversion—and content items that are not causing conversions. Further, portions of the budget can be reallocated during multi-armed bandit tests to deliver the digital content that is observed to achieve the desired action at a higher relative rate. However, such multi-armed bandit tests may not be capable of indicating highest action-achieving digital content with a suitable (e.g., a statistically significant) amount of certainty. Consequently, assumptions made based on the results of such tests may be in error.

To overcome these problems, performance-based digital content delivery is leveraged in a digital medium environment. In particular, the described techniques involve reallocating delivery of digital content during the course of the test in a manner that not only takes advantage of the digital content items that achieve higher rates of a desired action, but also identifies the content items achieving the desired action (e.g., highest-converting digital content of a digital marketing campaign) with statistically significant certainty. As part of doing so, the described techniques select from multiple different optimization techniques, and use the selected technique at intervals to determine an optimized allocation for delivering different content items (e.g., digital advertisements, emails, and so on) of a collection of content (e.g., a digital marketing campaign). In particular, the different techniques are selected based on whether a duration of the test is fixed or unknown, and based on a type of statistical guarantee associated with the test, e.g., based on whether the statistical guarantee comprises confidence intervals or t-scores.

For a content collection tested according to the described techniques, the associated content items are initially delivered to a substantially equal number of user devices. Data describing user interactions with the different items of content is then collected from the user devices. For instance, the data describes whether a user took a desired action in relation to one of the items of content, e.g., clicked a displayed advertisement for navigation to a different web page. Broadly speaking, the collected data is processed to determine measures of achievement for the different content items to achieve one or more desired actions. Measures of statistical guarantee are also computed that indicate an estimated accuracy of the measures of achievement. When it is determined that the test ends, the digital content item or items that "best" achieve the desired action—as indicated by the measures of achievement—can be presented to the user.

In accordance with the described techniques, the test is not ended until a specified condition is reached, however. The specified condition may correspond to a fixed test horizon, such as a condition that the test be ended once the different content items of a tested collection are delivered to a specified number of users, a specified amount of time elapses, a specified budget is reached for delivering the different content items of a tested campaign, and the like. Alternately, the specified condition may correspond to a test with an unknown horizon, such as when a user selects that the test is to end as soon as possible—as soon as a threshold measure of statistical guarantee is achieved. At iterations where it is determined the test is not ended, the selected optimization technique is used to compute an optimized allocation of the content for delivery. The delivery of the content is then adjusted so that the content is delivered according to the computed allocation. After a predefined time or number of deliveries under the optimized allocation, data describing the user interactions with the different items of content is again collected. The process of collecting such user interaction data, determining the measures of achievement and statistical guarantee, and computing the optimized allocations for content delivery are repeated until a test ending condition is determined to occur.

At that point, the digital content of the collection that achieves the desired action is identified based on the measures of achievement. In one or more implementations, a user may be presented information indicating the digital content having a highest rate of achieving the desired action. The user may also be presented with other information, such as information indicating a top-k items at achieving the desired action, the measures of statistical guarantee (e.g., that there is a 94.675% guarantee the highest-achieving content item is accurately identified), digital content having a lowest rate of achieving the desired action, a bottom-k items at achieving the desired action, and so forth.

Term Descriptions

In the following discussion, "digital content" refers to content that is shareable and storable digitally and thus may include a variety of types of content, such as documents, images, webpages, media, audio files, video files, and so on.

"Digital marketing content" refers to digital content provided to users related to marketing activities performed, such as to increase awareness of and conversion of products or services made available by a service provider, e.g., via a website. Accordingly, digital marketing content may take a variety of forms, such as emails, advertisements included in webpages, webpages themselves, and so forth.

As used herein, the term "conversion" refers to causation of a desired action as a result of exposure to a particular option that is measurable using a statistic, such as in response to digital marketing content. Examples of conversion include interaction of a user with the digital content (e.g., a "click-through"), purchase of a product or service that pertains to the digital content, and so forth. Conversion may be measured by a statistic in a variety of ways, such as binary values (e.g., did or did not convert), monetary amounts, conversion rate, and so forth.

The term "horizon" refers to an end of a test for identifying digital content to achieve a desired action. A test horizon can be "fixed" or "unknown." When a test horizon is fixed, a number of deliveries, time, or monetary budget, corresponding to the test is substantially known. One example of a "fixed horizon" for a test is a specified number of deliveries, which indicates that the test is to be performed until different content items of a campaign are delivered to the specified number of users, at which point the test ends.

For fixed horizon tests, the described optimization techniques are configured to determine allocations of deliveries based on achieving a maximum statistical significance over the known duration of the test. In contrast, the described optimization techniques for unknown horizon tests are configured to determine allocations of deliveries based on achieving a threshold measure of statistical guarantee as fast as possible, e.g., over as few deliveries of content as possible, in a shortest amount of time possible, using as little budget as possible, and so forth. An example of an "unknown" horizon is selection of an 'ASAP' option and a threshold measure of statistical guarantee.

As used herein, a "confidence interval" refers to an interval estimate that is computed from observed data, and is a range of values that act as estimates of the unknown population parameter. This measure of statistical guarantee reflects a confidence that a given interval includes the true value of its corresponding parameter.

As used herein, a "t-score" refers to a measure of statistical guarantee that a set of collected data (e.g., data collected from user devices at one iteration) is normal. In other words, t-scores indicate whether the set of collected data "looks like" data of the pertinent population as a whole—if the data were collectable from the entire population.

As used herein, the term "targeted digital content" refers to digital content that is adjusted to have different portions of content or characteristics (e.g., different images, different text, different colors, and so on) depending on a user segment to which it is delivered. By way of example, and not limitation, targeted digital content can include banners integrated into advertising portions of web pages, social media posts, video clips integrated into web pages, emails, and so on.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ testing and delivery techniques described herein. The illustrated environment 100 includes a service provider system 102, client device 104, marketing system 106, and source 108 of marketing data 110 (e.g., user interaction with digital content via respective computing devices) that are communicatively coupled, one to another, via a network 112. Although digital marketing content is described in the following, testing may be performed for a variety of other types of digital content, e.g., songs, articles, videos, and so forth, to determine "which is better" in relation to a variety of desired actions. These techniques are also applicable to testing of non-digital content, interaction with which is described using data that is then tested by the systems described herein.

Computing devices that are usable to implement the service provider system 102, client device 104, marketing system 106, and source 108 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 11.

The service provider system 102 is illustrated as including a service manager module 114 that is representative of functionality to provide services accessible via the network 112 that are usable to make products or services available to consumers. The service manager module 114, for instance, may expose a website or other functionality that is accessible via the network 112 by a campaign manager application 116 of the client device 104. The campaign manager application 116 may be configured in a variety of ways, e.g., it may be configured as a browser-based application, a native application capable of leveraging exposed marketing data 110, a network-enabled application, and so on that obtains data from the service provider system 102 via the network 112. This data can be employed by the campaign manager application 116 to enable a user of the client device 104 to perform a variety of actions in connection with the service provider system 102, such as to leverage information about collections of digital content (e.g., determine conversion rates of digital content, adjust delivery of digital content to promote the products or services, adjust characteristics of the digital content delivered, and so on), when the service provider system 102 provides conversion-testing-based resources.

In order to promote the products or services, the service provider system 102 may employ the marketing system 106. Although functionality of the marketing system 106 is illustrated as separate from the service provider system 102, this functionality may also be incorporated as part of the service provider system 102, further divided among other entities, and so forth. The marketing system 106 includes a marketing manager module 118 that is implemented at least partially in hardware of a computing device to provide digital marketing content 120 for consumption by users, which is illustrated as stored in storage 122, in an attempt to cause conversion of products or services of the service provider system 102 or conversion of some other experience of the service provider system 102, e.g., signing up initially to receive email 124.

The digital marketing content 120 may assume a variety of forms, such as the email 124, advertisements 126 (e.g., displayed in webpages or mobile applications), and so forth. The digital marketing content 120, for instance, may be provided as part of a digital marketing campaign 128 to the sources 108 of the marketing data 110. The marketing data 110 may then be generated based on the provision of the digital marketing content 120 to describe which users received which items of digital marketing content 120 (e.g., from particular marketing campaigns), characteristics of the users, and how the users interacted with the delivered items of the digital marketing content 120. From this marketing data 110, the marketing manager module 118 may control which items of digital marketing content 120 are provided to a subsequent user, e.g., a user of a mobile device, in order to increase a likelihood that the digital marketing content 120 is of interest to the subsequent user and causes conversion of the subsequent user.

Part of the functionality usable to control provision of the digital marketing content 120 is represented as a testing system 130. The testing system 130 is representative of functionality implemented at least partially in hardware (e.g., a computing device) to test an effect of the digital marketing content 120 on achieving a desired action, e.g., a metric such as conversion of products or services of the service provider system 102, conversion to opt-in to receive the email 124 of the service provider system 102, and so forth.

The testing system 130, for instance, may estimate a resulting impact of different options of digital marketing content 120 on conversion of products or services of the service provider system 102, e.g., as part of A/B testing. A variety of techniques may be used by the testing system 130 to perform this estimation, examples of which are described in the following and shown in the corresponding figures. Although data (e.g., the marketing data 110) that describes user interaction with digital content is discussed in the following as an example, the data being tested may also be used to describe user interaction with non-digital content, such as physical products or services, which is then tested using the systems described herein.

Having considered an example environment, consider now a discussion of some example details of the techniques for performance-based digital content delivery in a digital medium environment in accordance with one or more implementations.

Performance-Based Digital Content Delivery

Figure 2:
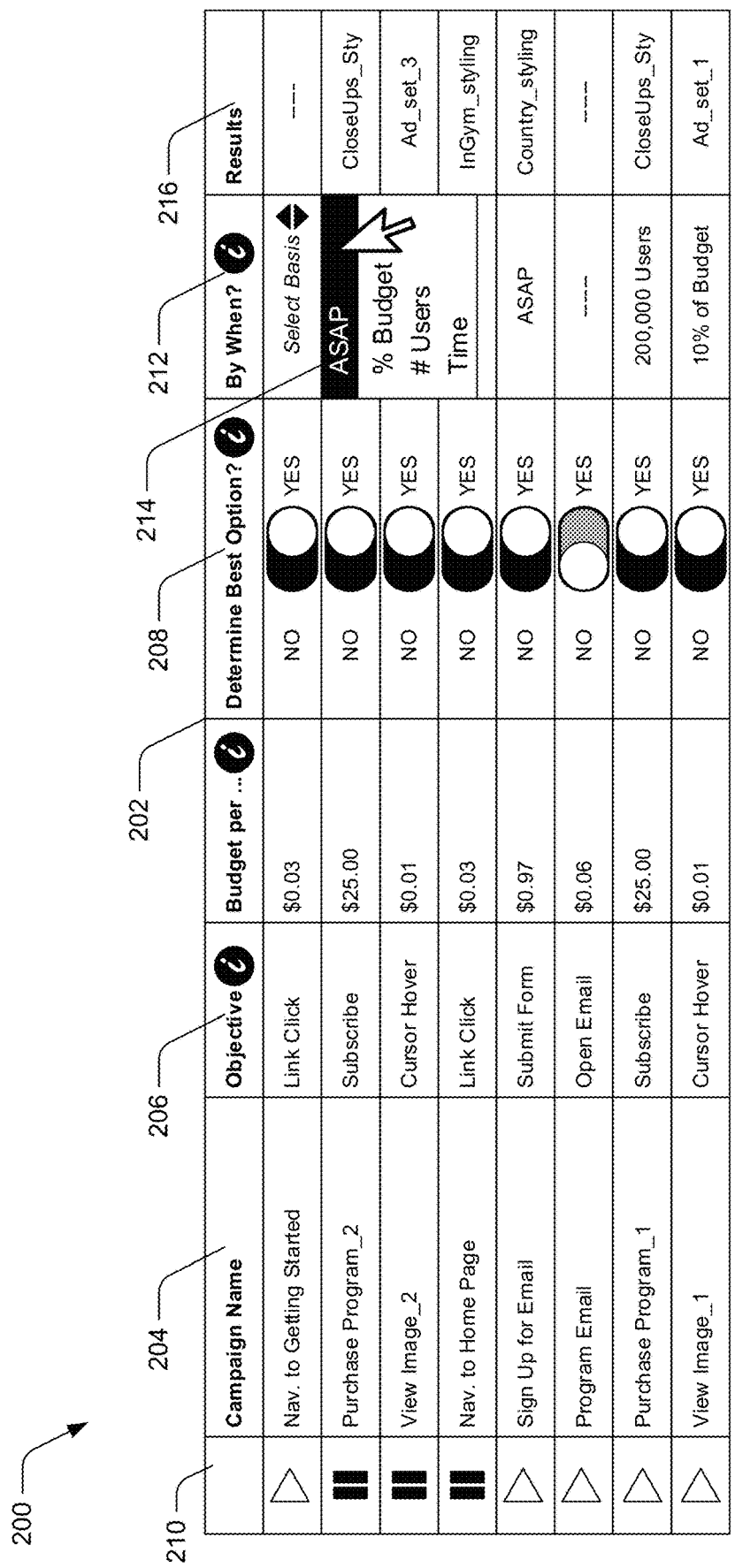
FIG. 2 depicts an example user interface configured to present selectable collections of digital content for conversion testing and delivery based on the testing.

FIG. 2 depicts an example user interface 200 that is configured to present selectable collections of digital content for conversion testing and delivery adjusting based on the testing. The illustrated example 200 includes test management interface 202, which is depicted as a displayable grid, though other configurations are contemplated in the spirit or scope of the techniques described herein.

The test management interface 202 may be generated based on the digital marketing content 120 and digital marketing campaigns 128 and presented responsive to a menu selection in the campaign manager applications 116. User selections made via the test management interface 202 may define parameters for conducting conversion tests on digital content collections and initiate those tests, e.g., for testing conversion of the digital marketing content 120 of specified digital marketing campaigns 128.

In general, the test management interface 202 allows a user of the client device 104 to specify collections of the digital marketing content 120 for conversion testing. The test management interface 202 presents different collections of the digital marketing content 120, which a user can select to test. The test management interface 202 also presents controls that allow a user to set different parameters for the tests. In the illustrated example, the test management interface 202 includes a collection name column 204, which identifies different collections of the digital content that can be selected by a user for testing. In one or more implementations, these collections correspond to different digital marketing campaigns 128 associated with the user, e.g., marketing campaigns created by or for the user. Accordingly, the collection name column 204 includes an identifier of the collections the user can select to test. As noted above and below, these tests may be performed to find which digital content of a given collection drives a highest conversion among users to which the digital content is delivered. For a collection of different digital advertisements, for instance, a test may be performed to find the advertisement having the highest conversion over the course of the test. Users can also select to rank the different digital content of a collection, such that for a collection determinations are made regarding highest-converting digital content, second-highest-converting digital content, and so on.

In the illustrated example, the test management interface 202 also includes conversion basis column 206, which allows a user to select the actions that are to serve as a basis for conversion of tested digital content. The conversion basis column 206 indicates different bases relative to which the digital content can be tested, including link click, subscribe, cursor hover, submit form, and open email. Different combinations of these and other bases may be used for the testing conversion of digital content without departing from the spirit or scope of the described techniques.

The test management interface 202 also includes test initiation column 208, which includes controls that allow a user to select to perform a conversion test when delivery of a corresponding collection of digital content is initiated. These controls allow a user to selectively test the digital content of a collection that is being delivered. To this extent, the test management interface 202 also includes delivery initiation controls 210. The delivery initiation controls 210 represent functionality for enabling a user to start, pause, or stop delivery of a corresponding collection of digital content. In the illustrated example, the delivery initiation control 210 depicted inline with the digital content collection named "Nav. to Getting Started" corresponds to a 'play' representation. This indicates that the digital content of "Nav. to Getting Started" is not yet being delivered and that selection of the representation can initiate delivery. In contrast, the delivery initiation control 210 depicted inline with the digital content collection named "Purchase Program_2" corresponds to a 'pause' representation. This indicates that the digital content of the "Purchase Program_2" is being delivered and that selection of the representation can pause the delivery.

To this extent, consider the controls of the test initiation column 208 that are inline with the collections "Nav. to Getting Started" and "Program Email." The test initiation control corresponding to "Nav. to Getting Started" is depicted indicating that the campaign's digital content is to be tested when delivered, e.g., the option button is biased to a "YES" indication. In contrast, the test initiation control corresponding to "Program Email" is depicted indicating that the campaign's digital content is not to be tested when delivered, e.g., the option button is biased to "NO" indication. In this example, the digital content of the "Nav. to Getting Started" campaign will thus be tested responsive to a user initiating delivery, e.g., by selecting the play representation. In this example, however, the digital content of the "Program Email" campaign will not be tested responsive to a user initiating delivery. The "yes/no" option depicted is one example of a control that can be used for enabling a user to selectively test the digital content of different campaigns that are delivered. A variety of different user interface instrumentalities may be leveraged for enabling a user to select to test the digital content of a collection without departing from the spirit or scope of the techniques described herein.

Additionally, the test management interface 202 is illustrated with test duration column 212. The test duration column 212 represents functionality for enabling a user to select a basis for the duration of a test. Selection of a duration is effective to specify whether the test has a fixed or unknown horizon. By way of example, dropdown 214 includes the selectable options 'ASAP', '% Budget', '# Users', and 'Time'. Selection of the ASAP option specifies an unknown horizon in one or more implementations. In particular, selection of the ASAP option can indicate not only that a user desires highest-converting digital content of a collection to be determined, but also that there is to be at least a threshold statistical significance associated with the determination, e.g., a threshold guarantee that the determination of the highest-converting digital content is accurate. The horizon is unknown, however, because the test may run until the highest-converting content is determined with the statistical significance, and the number of content deliveries to reach the desired statistical significance may vary.

In contrast to an unknown horizon, selection of the other options, e.g., '% Budget', '# Users', and 'Time', is effective to specify a fixed horizon in one or more implementations. Consider a scenario in which a user selects the number-of-users option and specifies a certain number of users for the test. The test ends when the digital content of the collection has been delivered to the specified number of users. Similarly, when the percent-of-budget option is selected, a test is performed until a specified percent of the collection's budget is reached. It also follows that when the time option is selected, a test is performed until the specified amount of time is reached. A variety of different test duration bases may be leveraged to specify an end of the described tests without departing from the spirit or scope of the techniques herein. The test management interface 202 can also be configured with different or additional controls for specifying different test parameters without departing from the spirit or scope of the techniques described herein. By way of example, additional controls may allow a user to specify a desired guaranteed level accuracy for the determinations, e.g., the user can specify that the determination of highest-converting content is to be 95% accurate. This may be used to set values for different parameters of the test, such as thresholds.

The test management interface 202 also includes test results column 216. The test results column 216 may indicate the digital content of a collection with the highest determined conversion, e.g., an ad 126 that has the highest conversion of a digital marketing campaign 128 with multiple different ads. The indicated results may indicate the digital content having the highest conversion at the end of the test or at some time during a test, e.g., a user may select to view the digital content with the highest level of conversion on the first day of a four-day test. In one or more implementations, the testing system 130 may update results of a test at different intervals during a test, e.g., daily, after some number of deliveries to users, after some amount of budget is used for performing the deliveries, and so forth.

Further, the test management interface 202 may be configured to display different results than simply highest-converting content. For instance, the test management interface 202 may be capable of displaying a ranking of different items of digital content in a collection, e.g., ranked based on determined conversion. The test management interface 202 may also be able to display a top or bottom k-number of different items of digital content, e.g., the top-2 converting digital content items of a collection, the bottom-2 converting digital content items of a collection, and so forth. Other information associated with the results of a given test may also be displayed as described in more detail in relation to FIG. 5.

Figure 3A:
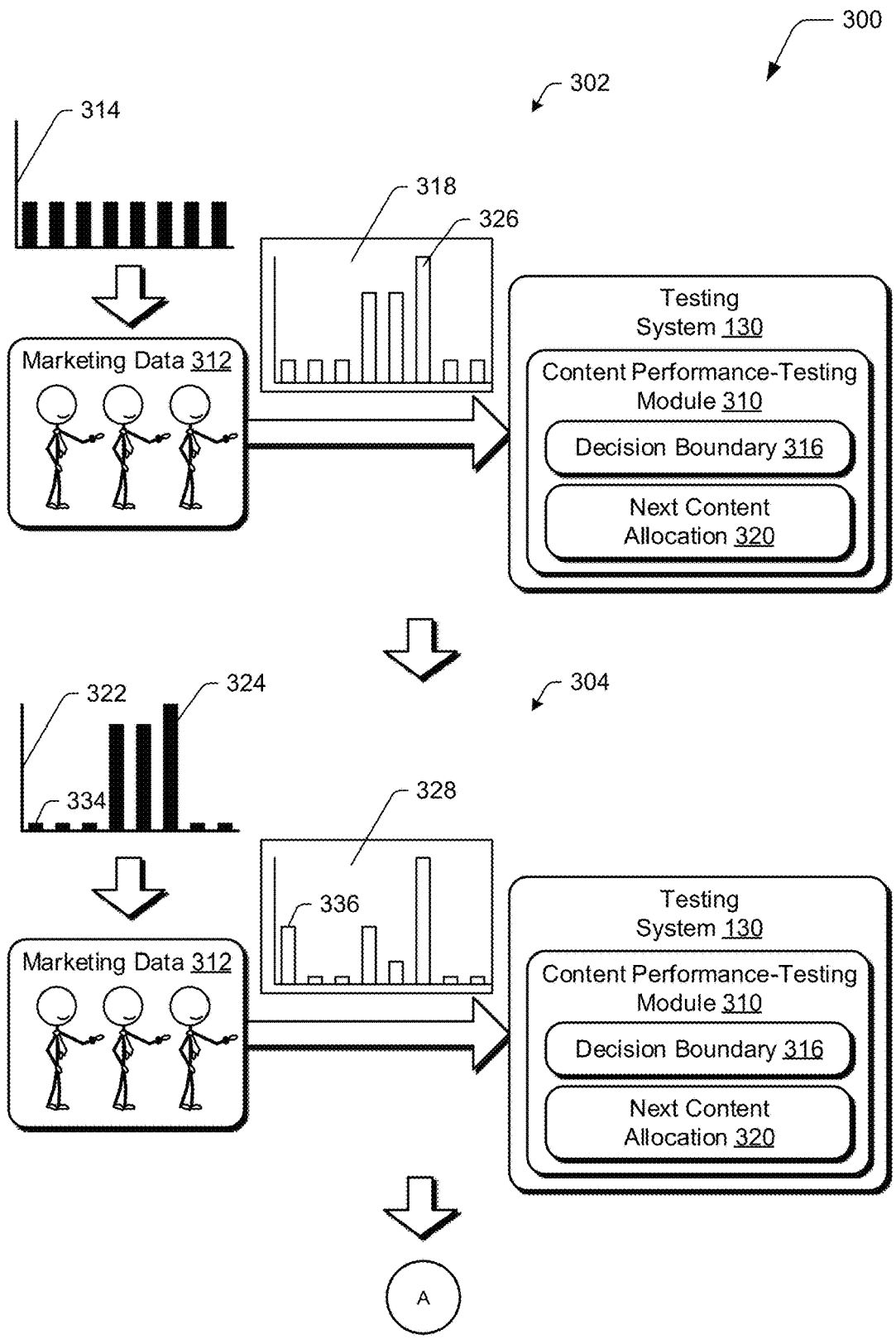
FIGS. 3A and 3B depict an example implementation in which conversion of delivered digital content is tested and in which delivery is adjusted based on the testing.
Figure 3B:
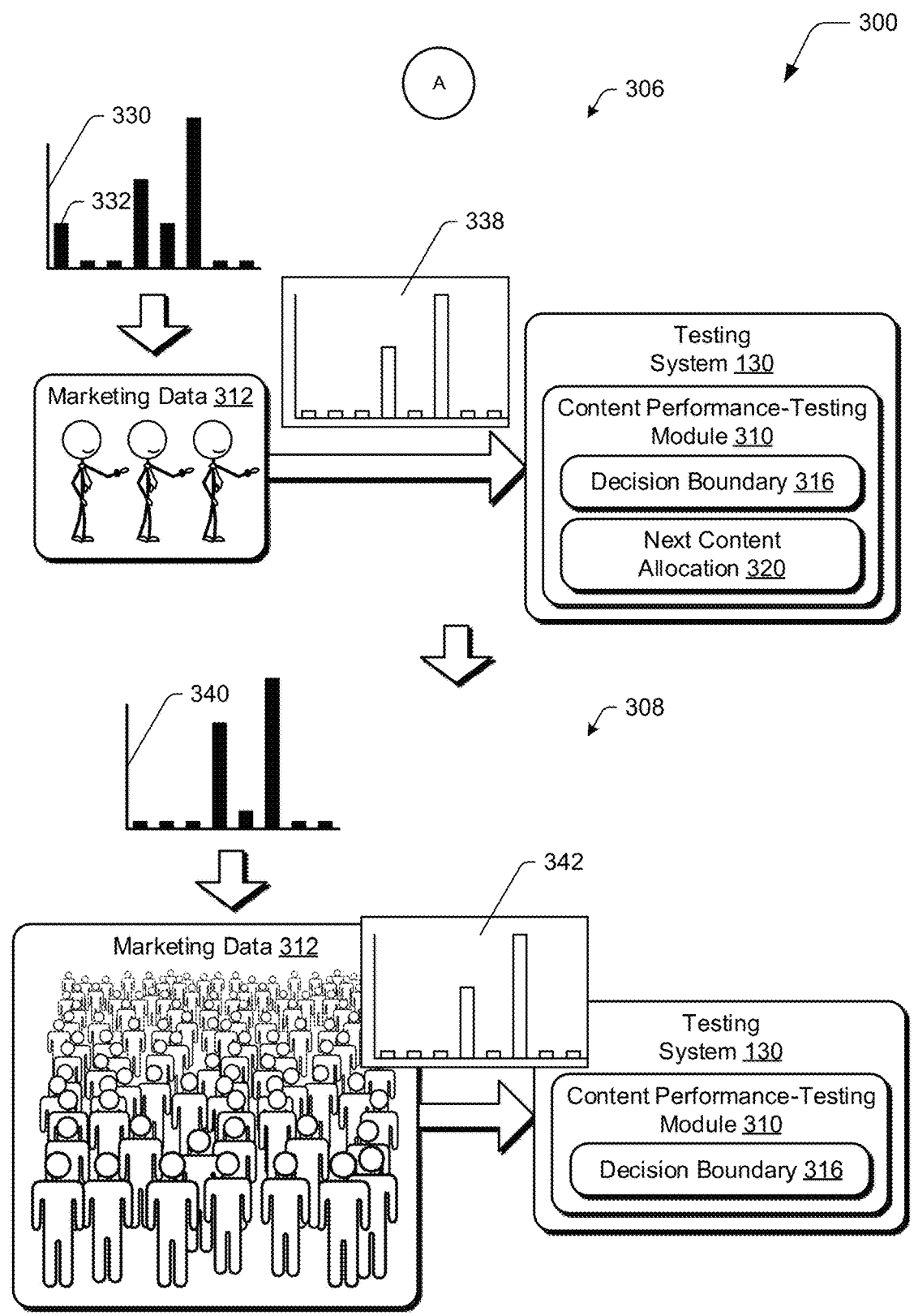

In the context of performing the tests, consider FIGS. 3A and 3B. FIGS. 3A and 3B depict an example implementation 300 in which the testing system 130 of FIG. 1 is configured to test conversion of delivered digital content and adjust further delivery based on the testing. In particular, the testing system 130 is illustrated using first and second stages 302, 304. The illustrated example 300 continues at 'A' from FIG. 3A to FIG. 3B, which includes third and fourth stages, 306, 308. It is to be appreciated that the testing system 130 may use a different number of stages (more or fewer) without departing from the spirit or scope of the techniques described herein.

The testing system 130 in this example includes a content performance-testing module 310. The content performance-testing module 310 is implemented at least partially in hardware to perform testing to determine an effect of different options on a metric describing achievement of an action, e.g., conversion rate on achieving conversion. The content performance-testing module 310 is also implemented to adjust delivery of the different options during tests to take advantage of options that perform better than other options in achieving the action, e.g., during the course of testing more content deliveries are allocated to an option that demonstrates a higher conversion rate than another option. In this example, the content performance-testing module 310 may collect marketing data 312, which corresponds to marketing data 110. In general, the marketing data 312 describes interaction of a plurality of users via respective computing devices with digital marketing content 120. By way of example, the marketing data 312 describes interaction of a plurality of users with the digital marketing content 120 of a particular digital marketing campaign 128, e.g., describing whether a user clicked on an item of digital marketing content 120, purchased a product or service, subscribed to emails, and so forth.

The illustrated example 300 also includes a first allocation representation 314, which indicates how delivery of different digital marketing content 120 of the digital marketing campaign 128 is initially allocated. In particular, the first allocation representation 314 indicates that at the first stage 302 each different content item of the digital marketing campaign 128 is delivered to approximately a same number of users. Initially, each different content item may be delivered to approximately a same number of users. This is because it is not yet known which items of the content cause higher levels of conversion than other items.

At a predetermined point, though, the conversion of the different items of delivered digital marketing content 120 of the digital marketing campaign 128 is determined. Decision boundary 316 represents data indicative of the point at which the conversion is determined. The decision boundary 316 may be based on an amount of elapsed time since the beginning of the test or since a prior decision boundary, a number of users to which the digital marketing content 120 has been delivered, a portion of budget exhausted due to delivery of the digital marketing content 120, and so forth. The decision boundary 316 may also be based on whether the parameters specified by a user request a test having a fixed or unknown horizon. Consider a fixed horizon scenario in which the test is to be performed for 20,000 users. In this scenario, the decision boundary 316 may correspond to data indicating 2,000 users—such that the content performance-testing module 310 analyzes the marketing data 312 after the digital marketing content 120 is delivered to 2,000 users. Regardless of the basis for the decision boundary 316, once the content performance-testing module 310 determines that the decision boundary 316 is reached, the content performance-testing module 310 analyzes the marketing data 312.

The illustrated example 300 also includes first conversion representation 318, which represents an amount of conversion for each of the delivered digital content items, as described by the marketing data 312. In accordance with the described techniques, the content performance-testing module 310 analyzes the marketing data 312 to determine conversion for each different item of the digital marketing content 120. Based on the determined conversion, the content performance-testing module 310 determines next content allocation 320. The next content allocation 320 corresponds to data describing how to allocate delivery of the different digital marketing content 120 of the digital marketing campaign 128 in the second stage 304. In one or more implementations, the next content allocation 320 may describe percentages of the deliveries that are to correspond to each different content item during the second stage 304. The next content allocation 320 may describe how to allocate delivery of the different items of digital marketing content 120 in other ways without departing from the spirit or scope of the techniques described herein.

Broadly speaking, the content performance-testing module 310 determines the next content allocation 320 by computing an optimized distribution of deliveries. In accordance with the described techniques, the distribution may be optimized for different criteria. In tests with a fixed horizon, for instance, the distribution may be optimized so as to achieve a highest statistical guarantee when the fixed horizon is reached that the identified highest-converting digital content is accurate. In contrast, for tests with unknown horizons, the distribution may be optimized so as to minimize a number of deliveries of the digital content before a defined statistical guarantee of accuracy is achieved. Accordingly, different optimization techniques may be leveraged by the content performance-testing module 310 to compute the optimized distribution based, in part, on the parameters set by a user via the test management interface 202. Some example optimization algorithms are described in relation to FIGS. 7-10.

With regard to the second stage 304, the digital marketing content 120 is delivered to users according to the next content allocation 320. In this context, the illustrated example 300 includes second allocation representation 322, which indicates how deliveries of the different digital marketing content 120 of the digital marketing campaign 128 are allocated during the second stage 304. Notably, the distributions represented by the first and second allocation representations 314, 322 are different. Rather than being substantially equal—as indicated by the first allocation representation 314—the distribution of content represented by the second allocation representation 322 indicates that there are more deliveries of some digital content items than there are of others. In particular, consider content allocation 324 as it compares to content conversion 326, which is indicated by the first conversion representation 318. The item of content corresponding to the content allocation 324 may be delivered more than other items of content during the second stage 304. This may be based on the corresponding item of content having higher conversion than the other items of content during the first stage 302 (as indicated by the content conversion 326 of the first conversion representation 318).

During the second stage 304, the content performance-testing module 310 analyzes the marketing data 312 based on the decision boundary 316. Consider again the example in which the test is associated with a fixed horizon of 20,000 deliveries to users and in which the decision boundary 316 corresponds to a value of 2,000 users. Once the content is delivered to 2,000 users during the second stage 304 (4,000 users overall), the content performance-testing module 310 analyzes the marketing data 312. Regardless of a basis of the decision boundary 316, the content performance-testing module 310 analyzes the marketing data 312 to determine the conversion of the different digital content items. In this context, consider second conversion representation 328, which represents an amount of conversion during the second stage 304 for each of the delivered digital content items, as described by the second stage 304's marketing data 312.

Based on the determined conversion of the different items of digital content at the second stage 304, the content performance-testing module 310 again determines the next content allocation 320. As at the first stage 302, the content performance-testing module 310 determines the next content allocation 320 by computing an optimized distribution of deliveries, e.g., according to the selected optimization technique used for the test. The next content allocation 320 determined at the second stage 304 describes how to allocate the different digital marketing content 120 and controls content deliveries during the third stage 306.

Accordingly, consider the third stage 306. In the third stage 306, the digital marketing content 120 is delivered to users according to the next content allocation 320 determined at the second stage 304. The illustrated example 300 further includes third allocation representation 330, which indicates how delivery of the digital marketing campaign's content is allocated during the third stage 306. Note that the distributions represented by the second and third allocation representations 322, 330 are different. In particular, consider content allocation 332 of the third allocation representation 330 as it compares to content allocation 334 of the second allocation representation 322. This indicates that more deliveries are allocated to the corresponding item of content in the third stage 306 than were allocated in the second stage 304. This is because a relatively higher conversion may have been determined for the corresponding item of content during the second stage 304. In this context, consider conversion representation 336 of the second conversion representation 328. The conversion representation 336 indicates that the corresponding item of content had higher conversion than at least some other items of content during the second stage 304. The conversion representation 336 also indicates that the corresponding item of content had a higher conversion during the second stage 304 than the corresponding item of content had during the first stage 302.

Given this, the content performance-testing module 310 may allocate more deliveries to the corresponding item of content in the third stage 306 than were allocated in the second stage 304. Broadly speaking, allocating deliveries in this way is considered "exploration." As noted above, exploration refers to reserving at least some deliveries to learn whether a given item of content converts at a different rate than determined during previous stages. The content performance-testing module 310 reserves deliveries for exploration because some content items may not cause conversions early in a test for a variety of different reasons, the content items may cause more or fewer conversions depending on the day of the week, current events, weather, and so forth. In other words, a highest-converting item of digital content over the course of the campaign may not cause conversions at a higher level than other digital content of a campaign during a first stage (or even a first number of stages). By reserving some deliveries for exploration, however, the content performance-testing module 310 is configured to predict which items of the digital marketing content 120 will have a highest conversion during the digital marketing campaign 128.

At the third stage 306 also, the content performance-testing module 310 analyzes the marketing data 312 based on the decision boundary 316. As at the previously discussed stages, the content performance-testing module 310 analyzes the marketing data 312 at the third stage 306 to determine the conversion of the different items of the digital marketing content 120. Third conversion representation 338 represents an amount of conversion determined for each of the delivered digital content items during the third stage 306, as described by its marketing data 312. Based on the determined conversion for the different items of digital content at the third stage, the content performance-testing module 310 again determines the next content allocation 320. The content performance-testing module 310 determines the next allocation at the third stage 306 by computing another optimized distribution of deliveries, e.g., again according to the selected optimization technique used for the test. The next content allocation 320 determined at the third stage 306 describes how to allocate the different digital marketing content and controls content deliveries during the fourth stage 308.

Consider now the fourth stage 308, in accordance with one or more implementations. In the fourth stage 308, the digital marketing content 120 is delivered to users according to the next content allocation 320 determined at the third stage 306. The illustrated example 300 further includes fourth allocation representation 340, which indicates how deliveries of the digital marketing campaign's content are allocated during the fourth stage 308. At the fourth stage, the content performance-testing module 310 again analyzes the marketing data 312 based on the decision boundary 316. In particular, the content performance-testing module 310 analyzes the data at the fourth stage 308 to determine the conversion of the different items of digital marketing content 120. The conversion of the different content items, as described by the marketing data 312 of the fourth stage 308, is represented by fourth conversion representation 342.

In contrast to the other stages, there is no next content allocation 320 depicted for the fourth stage 308. This represents an end of the test. The decision boundary 316 of the fourth stage 308 may correspond to the number of users, amount of time, or budget designated for performing the test, e.g., in a scenario with a fixed horizon. In a scenario with an unknown horizon, however, decision boundary 316 may correspond to achieving a threshold statistical guarantee of accuracy. For instance, the content performance-testing module 310 may compute measures indicative of the statistical guarantee (e.g., confidence interval, t-score, etc.) based on the collected marketing data 312. The content performance-testing module 310 can then compare the computed measures to the threshold indicated by the decision boundary 316. Based on the comparison of the measure to the threshold, the content performance-testing module 310 can determine that the test is ended. In a scenario where the measure of statistical guarantee is a confidence interval, for instance, the content performance-testing module 310 can determine an end of the test when the comparison indicates that a confidence interval of the highest-converting digital content exceeds a threshold confidence. It should be appreciated that, depending on the statistical guarantee used, the content performance-testing module 310 may determine to end the test when the comparison indicates the computed measure is below the threshold. In any case, the fourth stage 308 indicates an end of a conversion test. At this point, the testing system 130 is capable of generating digital content indicative of the test result, as described in more detail in relation to FIG. 5.

Figure 4:
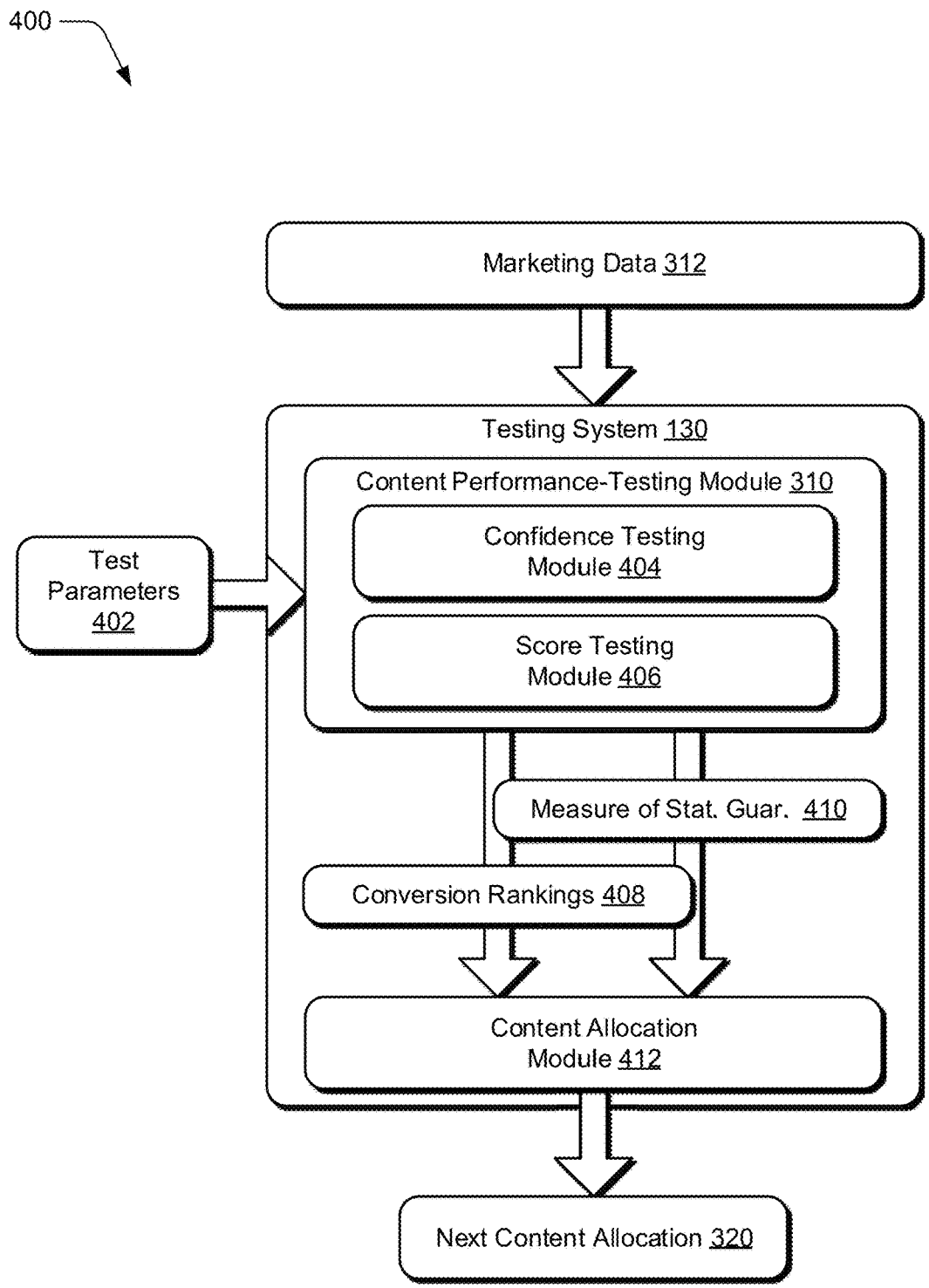
FIG. 4 depicts an example implementation in which a marketing system of FIG. 1 determines conversion of delivered digital content and adjusts further delivery of the digital content based on the determined conversion.

Prior to discussing test results that can be generated and presented to a user, however, consider FIG. 4. FIG. 4 depicts an example implementation 400 in which a marketing system 106 of FIG. 1 determines conversion of delivered digital content and adjusts further delivery of the digital content based on the determined conversion.

The illustrated example 400 includes from FIG. 1 the testing system 130, which includes the content performance-testing module 310 of FIG. 3. The next content allocation 320 of FIG. 3 is also illustrated in the example 400. In general, the illustrated example 400 represents data that may be received and generated in connection with a single iteration of a conversion test, such that it corresponds to one of the stages illustrated in FIGS. 3A and 3B.

In the illustrated example 400, the content performance-testing module 310 receives test parameters 402, which represent data indicative of selections made by a user for performing the conversion test, e.g., selections made via the test management interface 202 of FIG. 2. In addition, the content performance-testing module 310 is depicted including confidence testing module 404 and score testing module 406. Broadly speaking, these modules represent functionality to determine conversion rankings 408 and generate data describing them and measures of statistical guarantee 410 based on the marketing data 312 and the test parameters 402. Here, the conversion rankings 408 represent an ordered list of the different digital marketing content of a digital marketing campaign that is ordered according to relative conversion. The measure of statistical guarantee 410 represents data indicative of a degree to which the conversion rankings 408 are guaranteed accurate.

In accordance with the described techniques, the confidence testing module 404 and the score testing module 406 represent functionality to compute different measures of statistical guarantee 410. For example, the confidence testing module 404 is configured to compute the measure of statistical guarantee 410 as confidence intervals, and the score testing module 406 is configured to compute the measure of statistical guarantee as t-scores. The content performance-testing module 310 may select to leverage the functionality of the confidence testing module 404 or the score testing module 406. The content performance-testing module 310 may make this selection so that at the end of the test, deliveries of the different items of digital marketing content are allocated such that: (1) a largest difference between a confidence interval of the highest converting digital marketing content and the other digital marketing content of the campaign is achieved, or (2) a minimum t-score computed between the highest converting digital marketing content and the other digital marketing content is maximized. The content performance-testing module 310 leverages the functionality of the confidence testing module 404 in connection with the first option (largest difference in confidence intervals) and the functionality of the score testing module 406 in connection with the second option (maximizing minimum t-scores). In the illustrated example 400, the content performance-testing module 310 provides the conversion rankings 408 and the measures of statistical guarantee 410 to content allocation module 412.

In general, the content allocation module 412 is configured to determine the next content allocation 320 based on the conversion rankings 408 and the measures of statistical guarantee 410. In particular, the content allocation module 412 uses different optimization algorithms to determine the next content allocation 320 based, in part, on whether the horizon for the test is fixed or unknown, as indicated by the test parameters 402. The optimization algorithm used by the content allocation module 412 is also based on a type of statistical guarantee, e.g., based on whether the measures of statistical guarantee 410 are confidence intervals or t-scores.

By way of example, the content allocation module 412 determines the next content allocation 320 according to a first optimization algorithm when the horizon is fixed and the measures of statistical guarantee 410 are confidence intervals, e.g., as computed by the confidence testing module 404. Further, the content allocation module 412 determines the next content allocation 320 according to a second optimization algorithm when the horizon is fixed and the measures of statistical guarantee 410 are t-scores, e.g., as computed by the score testing module 406. When the horizon is unknown and the measures of statistical guarantee 410 are confidence intervals, the content allocation module 412 determines the next content allocation 320 according to a third optimization algorithm Finally, the content allocation module 412 determines the next content allocation 320 according to a fourth optimization algorithm when the horizon is unknown and the measures of statistical guarantee 410 are t-scores.

The confidence testing module 404 may compute the measure of statistical guarantee 410 as confidence intervals in accordance with the following discussion. In this discussion, the term $N_i$ represents a number of deliveries of a given item of digital marketing content 120 of the digital marketing campaign 128, the term k represents the total number of different content items included as part of the digital marketing campaign 128, and the term N represents a number of total deliveries of content items of the digital marketing campaign 128. The sum of deliveries of the different items of digital marketing content is thus equal to N, which may be expressed as follows:

$$\sum_{1}^{k} N_i = N.$$

Further, the terms $X_i^1, X_i^2, \ldots, X_i^{N_i}$ represent conversions of deliveries allocated to a given item of content i. As one example, the conversions may be zero or one, indicating that a user either converges or does not converge. In addition or alternately, the confidence testing module 404 can form confidence intervals based on a model. In one or more implementations, the confidence testing module 404 computes a measure of statistical guarantee (e.g., an α-level confidence interval) for the given item of content i according to the following:

$$[L_i, U_i] = \left[\hat{p}_i - \alpha\sqrt{\frac{\hat{p}_i(1-\hat{p}_i)}{N_i}}, \hat{p}_i + \alpha\sqrt{\frac{\hat{p}_i(1-\hat{p}_i)}{N_i}}\right]$$

Here, the term $L_i$ represents a lower bound and the term $U_i$ represents an upper bound of the confidence interval for the given item of content i, and $\hat{p}_i$ is the empirical mean of conversions of deliveries allocated to the item of content i. The confidence testing module 404 further determines a tolerance a from a tail of a t-student distribution with $N_i-1$ degrees of freedom. The value of the term α corresponds to a specified degree to which the determination of the highest converting digital content is accurate to be guaranteed accurate. By way of example, for a 95% guarantee that the highest converting digital content is accurately identified, the value of a is approximately 1.96. This specified degree may be set by a user and correspond to one of the test parameters 402, e.g., the user may select an option for the test results to be 90% accurate, 95% accurate, 99% accurate, and so on. It is to be appreciated, however, that a test may take a longer amount of time or involve more deliveries in order to achieve a higher degree of guaranteed.

Turning now to a discussion of the score testing module 406 in accordance with one or more implementations. The score testing module 406 may be configured to compute the measure of statistical guarantee 410 as t-scores as follows. In this discussion, the term i represents a given item of the digital marketing content and the term j represents a different item of the digital marketing content. Further, the terms $N_i$ and $N_j$ represent a number of deliveries of the given content item i and the different content item j, respectively. The terms $\hat{p}_i$ and $\hat{p}_j$ represent the empirical means of conversions determined for the given content item i and the different content item j, respectively. The score testing module 406 may be configured to compute the empirical means of conversions as discussed above in reference to the confidence interval calculations. Additionally, the term $t_{ij}$ represents a t-score between the given content item i and the different content item j. In one or more implementations, the score testing module 406 computes the t-score according to the following:

$$t_{ij} = \frac{\hat{p}_i - \hat{p}_j}{\sqrt{\frac{\hat{p}_i(1-\hat{p}_i)}{N_i} + \frac{\hat{p}_j(1-\hat{p}_j)}{N_j}}}$$

The score testing module 406 can then compare the computed t-score to threshold α. In scenarios where the comparison indicates that $t_{ij}$ is greater than or equal to the threshold α, the score testing module 406 determines that the given content item i is higher converting than the different content item j at a level of confidence $T^{-1}(\alpha)$. The score testing module 406 may determine this based on $t_{ij}$ being distributed (e.g., among the conversions caused by the delivered digital marketing content) according to a t-student distribution with $N_i+N_j-1$ degrees of freedom. In one or more implementations, the content performance-testing module 310 may determine an end of the test when t-scores computed between a highest-converting item of digital marketing content and each other item of digital marketing content are greater than the threshold α. As noted above, the test may also be ended based on exhaustion of the specified number of content deliveries, specified time for the test, specified budget for the test, and so forth. In any case, once the testing system 130 ends the test, the testing system 130 may generate digital content to present the results to a user, e.g., to present the highest-converting digital marketing content of a campaign. It is to be appreciated that different measures of statistical guarantee—other than confidence intervals and t-scores—may serve as a basis for computing an optimized distribution for delivering digital marketing content of a campaign without departing from the spirit or scope of the techniques described herein.

Figure 5:
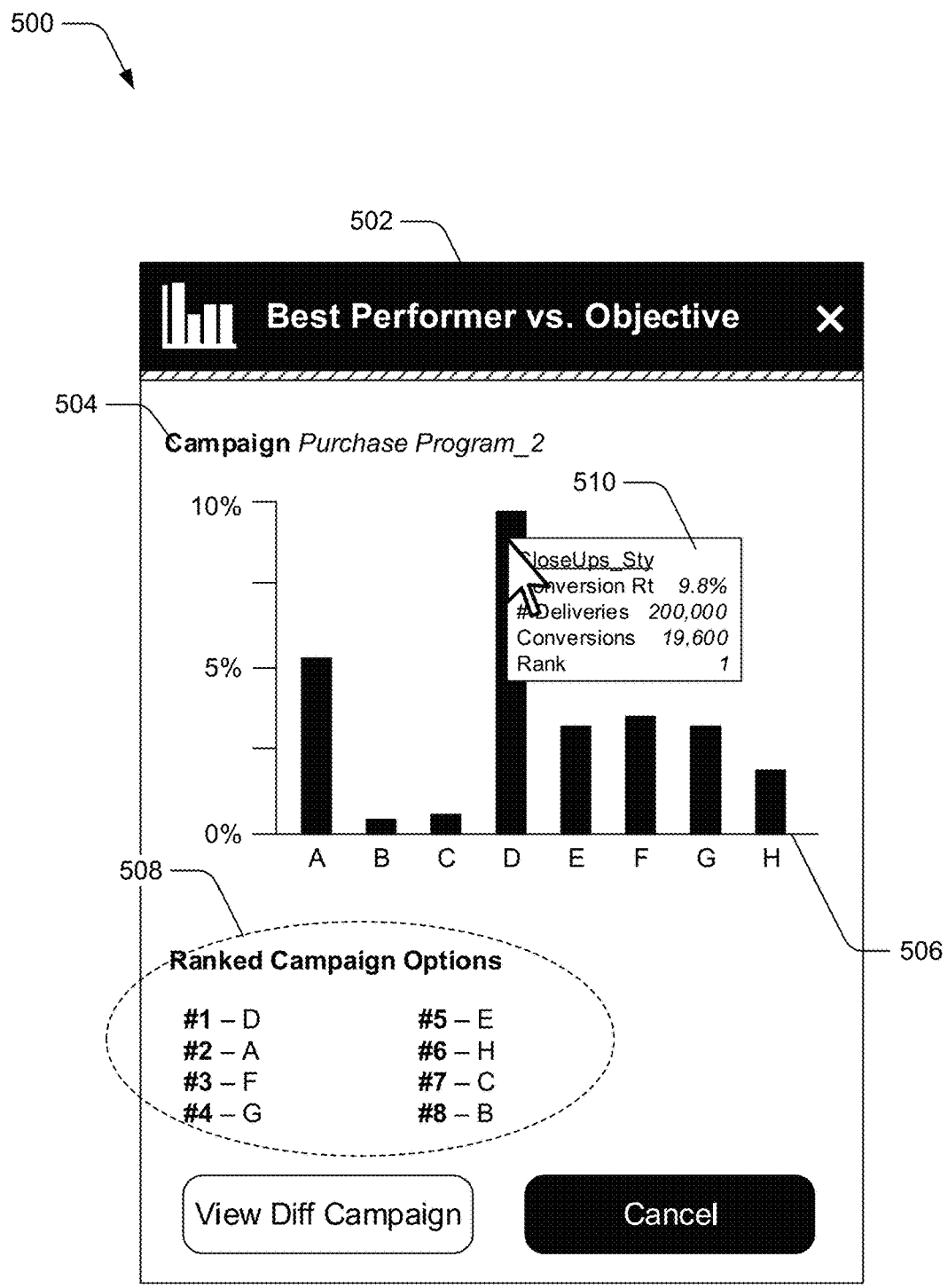
FIG. 5 depicts an example user interface configured to present results of testing different digital content in a manner that exploits conversion of at least some of the digital content.

FIG. 5 depicts an example user interface 500 for presenting results of testing different digital content in a manner that exploits conversion of at least some of the digital content. The illustrated example 500 includes conversion reporting interface 502, which is depicted as a displayable dialog box though other configurations are contemplated within the spirit or scope of the techniques described herein.

The conversion reporting interface 502 may be generated responsive to the content performance-testing module 310 determining that a test for identifying highest-converting digital content of a campaign is ended, e.g., based on comparison of the computed measures of statistical guarantee 410 to a threshold or due to exhaustion of specified deliveries for the test, a specified budget for the test, a specified time period, and so forth. Furthermore, the conversion reporting interface 502 may be presented to a user of the client device 104 via the campaign manager application 116.

In the depicted example, the conversion reporting interface 502 includes campaign label 504, visual indication of conversion 506, and content item ranking 508. The campaign label 504 identifies a name of the campaign for which the test to identify highest-converting digital content is run. In this example, the visual indication of conversion 506 visually indicates the determined conversion of each different content item included in the identified campaign. Though the visual indication of conversion 506 is depicted as a bar chart, the visual indication of conversion 506 may be configured in a variety of different ways without departing from the spirit or scope of the techniques described herein. The visual indication of conversion 506 can also be configured to convey information other than a conversion rate for the different items of content without departing from the spirit or scope of the techniques described herein.

The content item ranking 508 of the conversion reporting interface 502 indicates a ranking of the different content items in terms of relative conversion rate. In particular, the content item ranking 508 is ordered based on conversion rate such that a highest-converting digital content item (e.g., digital content item 'D') is ranked first (e.g., most favorably) and a lowest-converting digital content item (e.g., digital content item 13') is ranked last (e.g., least favorably). The conversion reporting interface 502 is also depicted with content item properties box 510, which may include properties of the digital content item relative to which the content item properties box 510 is displayed. Such properties may include a name of the digital content item, a conversion rate of the digital content item over the course of the test (or for a particular stage), a number of deliveries of the item to users, a number of times those deliveries resulted in a desired action (e.g., conversion) by the user, a rank of the digital content item in relation to the other digital content items of the campaign, and so forth. Further, the content item properties box 510 may be displayed responsive to a user hovering a cursor over a conversion representation associated with the digital content item. The content item properties box 510 may be displayable responsive to a variety of other user actions, including selecting the conversion representation, selecting or hovering over the corresponding ranking in the content item ranking 508, tapping with a finger or stylus a conversion representation or ranking, and so forth.

Although the conversion reporting interface 502 is shown with a variety of information, the conversion reporting interface 502 may be configured to present different combinations of information that relates to conversion by different items of digital marketing content of a digital marketing campaign and/or a highest-converting item of the digital marketing content without departing from the techniques herein. By way of example, this information may include measures of statistical guarantee 410, e.g., as computed by the confidence testing module 404 and the score testing module 406. Moreover, this information may be presented in a variety of different ways, such as visually via a display device, audibly via speakers associated with a computing device, and so forth.

Having discussed example details of the techniques for performance-based digital content delivery in a digital medium environment, consider now some example procedures to illustrate additional aspects of the techniques.

Example Procedures

This section describes example procedures for performance-based digital content delivery in a digital medium environment in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the service provider system 102 of FIG. 1 that makes use of testing system 130 or the client device 104 that makes use of the campaign manager application 116.

Figure 6A:
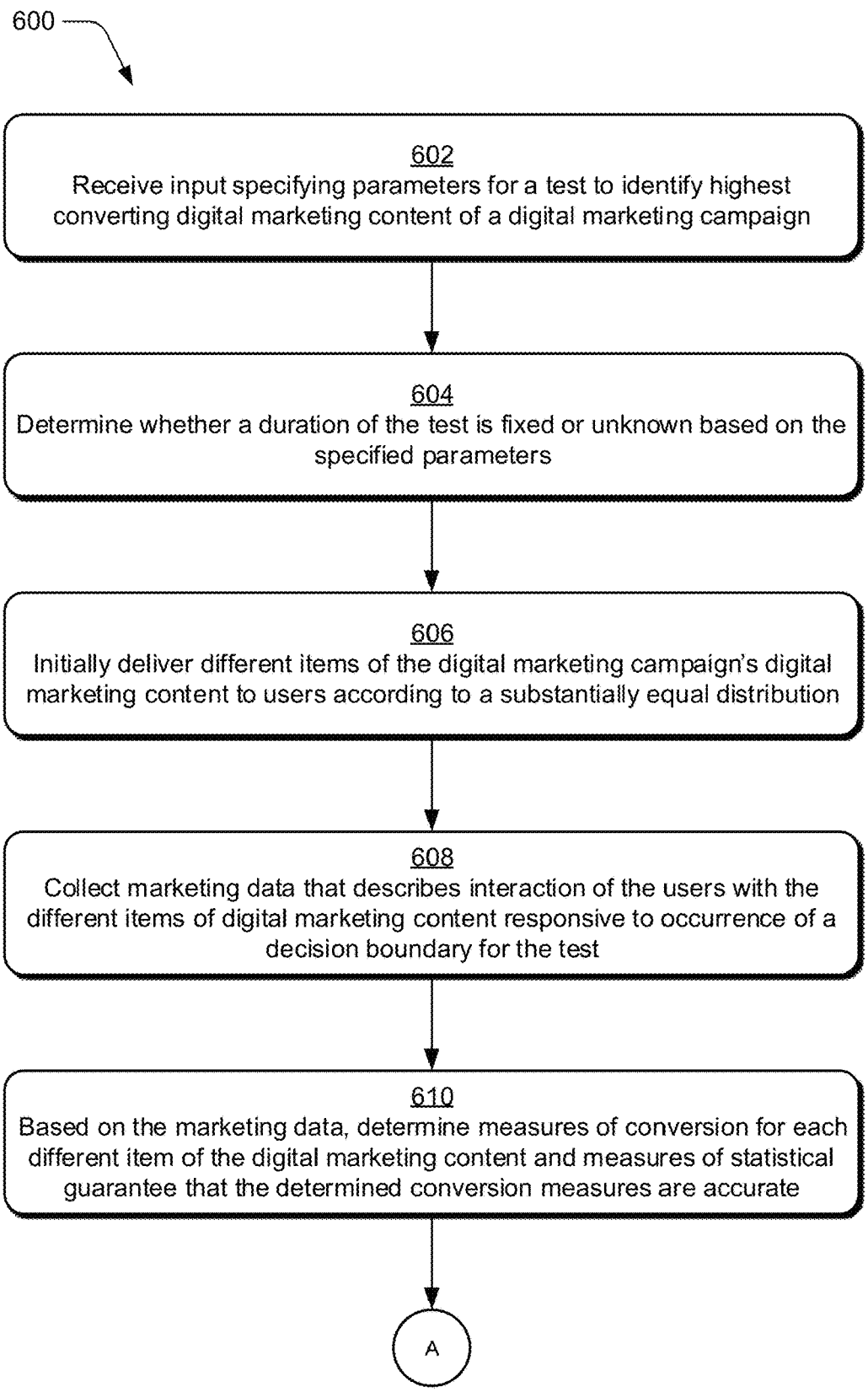
FIGS. 6A and 6B depict a procedure in an example implementation in which conversion of different digital content is determined and delivery is adjusted over the course of a test based on the determined conversion.
Figure 6B:
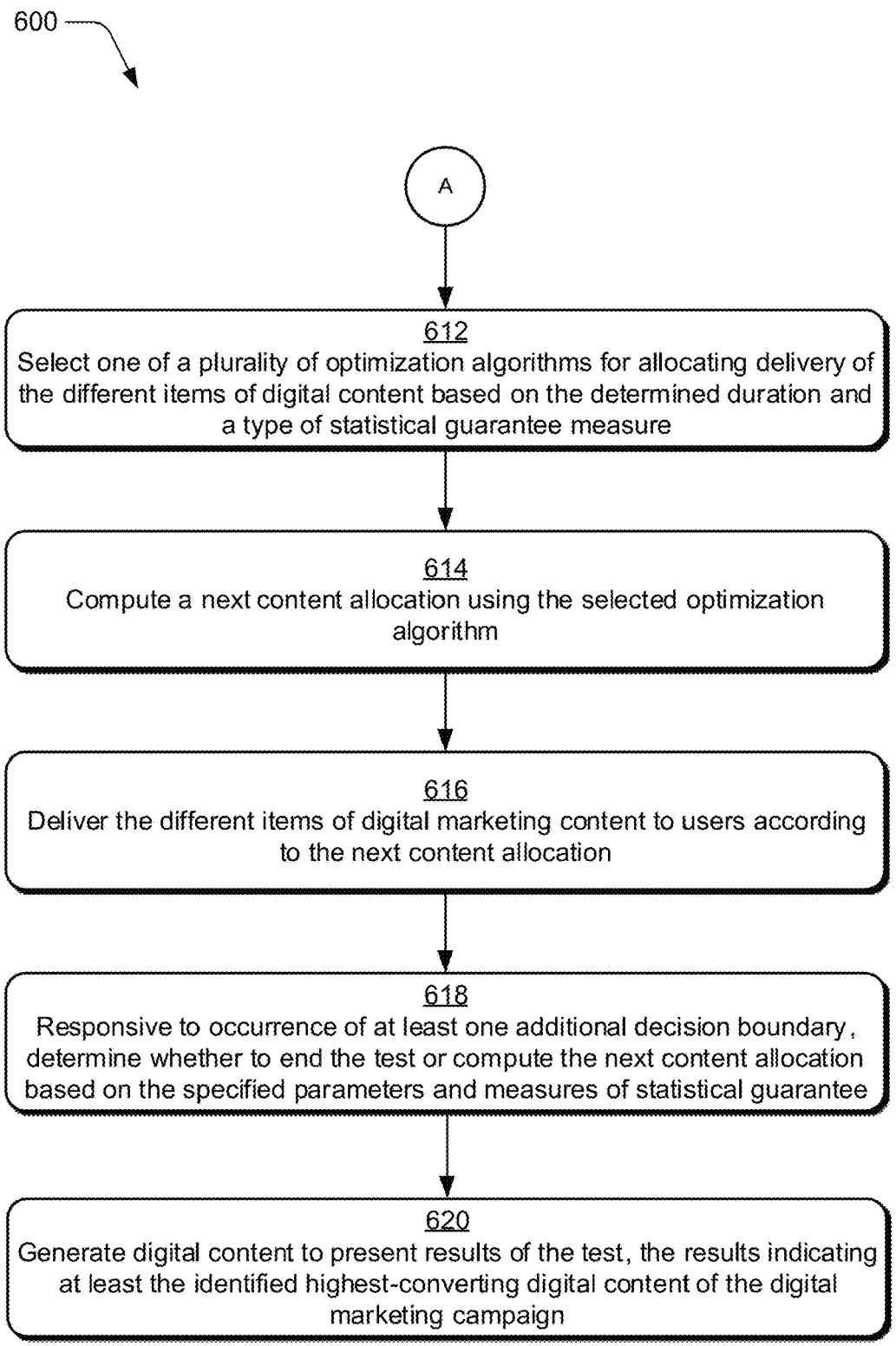

FIGS. 6A and 6B depict an example procedure 500 in which conversion of different digital content is determined and delivery is adjusted over the course of a test based on the determined conversion. Input is received that specifies parameters for a test to identify highest converting digital content of a digital marketing campaign (block 602). By way of example, user input is received via the test management interface 202 that specifies parameters for a test to identify highest converting digital marketing content 120 of the digital marketing campaign 128. For instance, the user input specifies to initiate the test for a particular campaign, specifies a duration for the test (e.g., ASAP, a specified number of users, a specified amount time, a specified budget), a specified statistical guarantee that results of the test are accurate (e.g., a 90, 95, or 99% guarantee that the determined results are accurate), and so forth. The campaign manager application 116 uses the user input received via the test management interface 202 to generate the test parameters 402. Accordingly, the testing system 130 receives the test parameters 402 for conducing the test.

A determination is made regarding whether a duration of the test is fixed or unknown based on the specified parameters (block 604). By way of example, the content performance-testing module 310 determines whether the duration of the test is fixed or unknown based on the test parameters 402. When the test parameters 402 indicate that the highest-converting digital marketing content is to be identified as soon as possible, then the duration of the test is considered unknown. However, the duration of the test is fixed when the test parameters 402 indicate that the highest-converting digital marketing content is to be identified after the content is delivered to some number of users, a specified budget is exhausted, a specified duration of time, and the like.

The different items of digital marketing content of the digital marketing campaign are delivered to users (block 606). In accordance with the principles discussed herein, the different items of digital content are initially delivered according to a substantially equal distribution, such that approximately a same number of each content item is delivered to users. By way of example, the marketing manager module 118 delivers each of the different emails 124 and different ads 126 of the digital marketing campaign 128 to a substantially same number of the sources 108.

Marketing data is collected that describes interaction of the users with the delivered content (block 608). In accordance with the principles discussed herein, the marketing data is collected responsive to occurrence of a decision boundary associated with the test. By way of example, the content performance-testing module 310 determines that the decision boundary 316 occurs. As mentioned above, the decision boundary may correspond to an amount of time (e.g., every 6 hours), a number of content deliveries (e.g., 10% of the deliveries specified for the entirety of the test), an amount of budget, and so forth. Responsive to determining the decision boundary 316 occurs, the testing system 130 collects the marketing data 312, which describes interaction of the sources 108 with the digital marketing content delivered at block 606.

Based on the marketing data, measures of conversion for each different item of digital marketing content are determined along with measures of statistical guarantee that the determined conversion measures are accurate (block 610). By way of example, the content performance-testing module 310 leverages the functionality of the confidence testing module 404 or the score testing module 406 to determine the conversion rankings 408 and the measures of statistical guarantee 410 based on the marketing data 312. As noted above, the confidence testing module 404 is configured to generate the measures of statistical guarantee 410 as data indicative of confidence intervals and the score testing module 406 is configured to generate the measures of statistical guarantee 410 as data indicative of t-scores. The procedure 600 continues at 'A' from FIG. 6A to FIG. 6B.

An algorithm of a plurality of optimization algorithms for allocating delivery of the different items of digital content is selected based on the determined duration and a type of statistical guarantee measure (block 612). By way of example, the content allocation module 412 selects a first optimization algorithm for computing the next content allocation 320 when the duration is fixed and the measures of statistical guarantee 410 are confidence intervals, a second optimization algorithm when the duration is fixed and the measures of statistical guarantee 410 are t-scores, a third optimization algorithm when the duration is unknown and the measures of statistical guarantee 410 are confidence intervals, and a fourth optimization algorithm when the duration is unknown and the measures of statistical guarantee 410 are t-scores.

In this context, consider FIGS. 7-10, which represent different optimization algorithms. FIG. 7 depicts an example optimization algorithm 700 for determining an optimized allocation of content deliveries when a duration of the test is fixed (as determined at block 604). The example optimization algorithm 700 determines optimized allocations of the deliveries based on confidence intervals. FIG. 8 depicts an example optimization algorithm 800 for determining an optimized allocation of content deliveries when a duration of the test is fixed also. In contrast to the optimization algorithm 700, however, the example optimization algorithm 800 determines optimized allocations of the deliveries based on t-scores. FIG. 9 depicts an example optimization algorithm 900 for determining an optimized allocation of content deliveries when a duration of the test is unknown. The example optimization algorithm 900 determines optimized allocations of the deliveries based on confidence intervals. FIG. 10 depicts another example optimization algorithm 1000 for determining an optimized allocation of content deliveries when a duration of the test is unknown. In contrast to the optimization algorithm 900, however, the example optimization algorithm 1000 determines optimized allocations of the deliveries based on t-scores.

Continuing with the discussion of the procedure 600, a next content allocation is computed according to the selected optimization algorithm (block 614). By way of example, the content allocation module 412 computes the next content allocation 320 at the first stage 302 based on the algorithm selected at block 612. The different items of digital marketing content of the digital marketing campaign are delivered to users according to the next content allocation (block 616). By way of example, during the second stage 304 the marketing manager module 118 delivers the different emails 124 and different ads 126 of the digital marketing campaign 128 according to the next content allocation 320, e.g., as computed at the first stage 302.

Responsive to occurrence of at least one additional decision boundary, a determination is made regarding whether to end the test or compute the next content allocation (block 618). In accordance with the principles discussed herein, this determination is made based on the specified parameters and the measures of statistical guarantee. By way of example, the content performance-testing module 310 determines that the decision boundary 316 occurs. Here, the content performance-testing module 310 determines whether the test is to be ended based on the test parameters 402, e.g., whether a specified number of deliveries, budget, or time is exhausted. Alternately, the content performance-testing module 310 determines whether the test is to be ended based on the measures of statistical guarantee 410, e.g., if these measures meet a threshold guarantee of accuracy specified for the test. If the content performance-testing module 310 determines that the test is ended, then the method continues to block 620. However, if the test parameters 402 or the measures of statistical guarantee 410 do not indicate that the test is to be ended, then the method returns to block 608 to again collect marketing data that describes interaction of the users with digital content delivered according to the next content allocation 320. Blocks 608 through 618 are repeated for additional iterations until the content performance-testing module 310 determines an end of the test.

Digital content is generated to present results of the test (block 620). In accordance with the principles discussed herein, the presented results indicate at least the highest-converting digital content of the digital marketing campaign. By way of example, the content performance-testing module 310 generates digital content indicative of results of the test performed in blocks 602 through 618. For instance, the content performance-testing module 310 generates the conversion reporting interface 502 or data that can be communicated to the client device 104 to enable the campaign manager application 116 to generate the conversion reporting interface 502. The client device 104 outputs the conversion reporting interface 502 via the campaign manager application 116. In this scenario, the conversion reporting interface 502 is displayed. However, the conversion results may be output in other ways such as audibly.

Having described example procedures in accordance with one or more implementations, consider now an example system and device that can be utilized to implement the various techniques described herein.

Example System and Device

Figure 11:
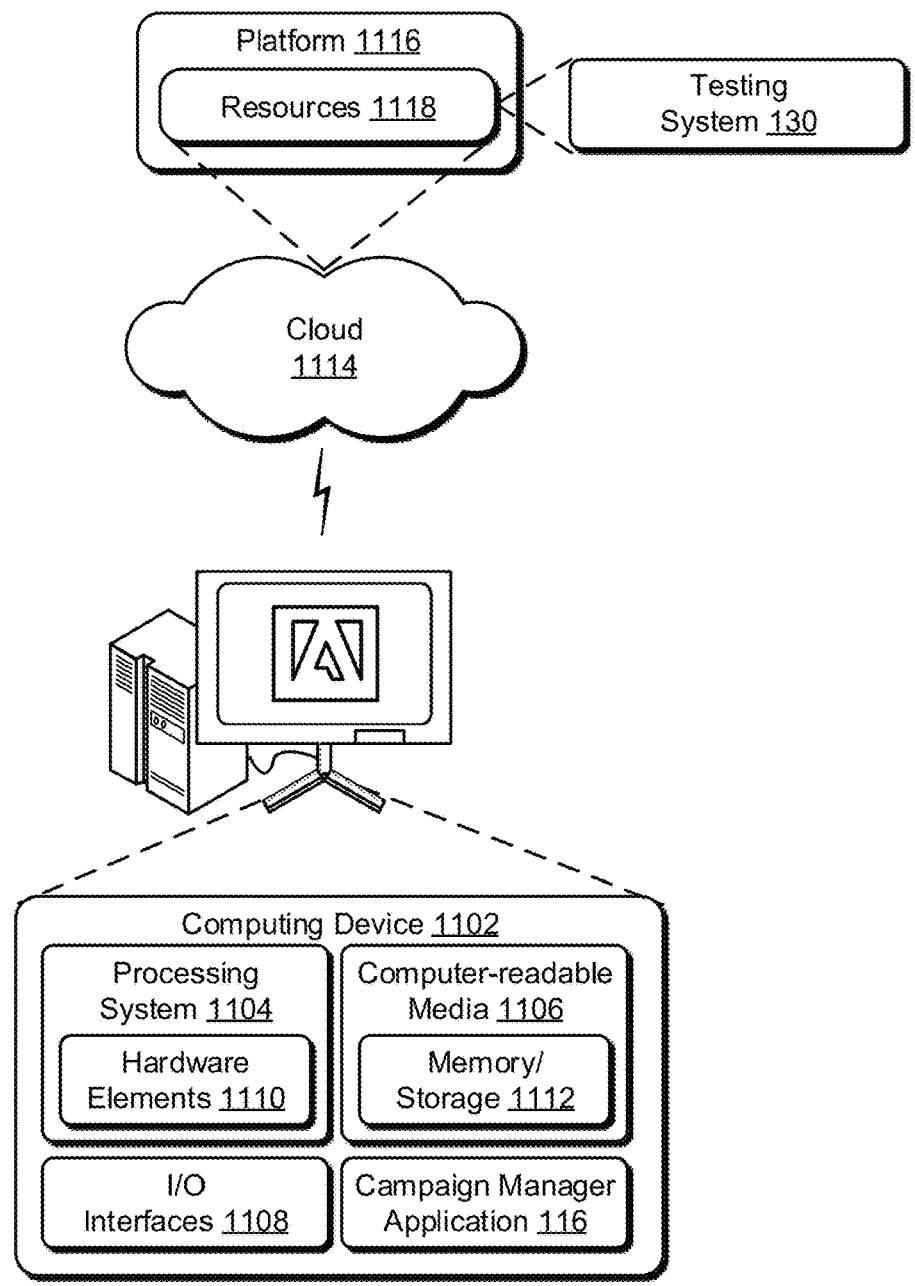
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the testing system 130 and the campaign manager application 116. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to identify digital content of a collection of different digital content that achieves a desired action, a method implemented by at least one computing device, the method comprising:
    receiving, by the at least one computing device, a request via a graphical user interface to test the collection of different digital content to identify the digital content of the collection that achieves the desired action, the request including data indicative of a condition defining a test end;
    delivering, by the at least one computing device, the collection of digital content according to initial delivery allocation data that indicates to deliver different digital content items of the collection to a substantially equal number of user devices;
    selecting, by the at least one computing device, one of a plurality of allocation optimization algorithms used for delivery of the different digital content items based on the condition defining the test end and a type of statistical guarantee associated with the test end, each algorithm of the plurality of allocation optimization algorithms being used in connection with a combination's of conditions defining the test end and types of statistical guarantees that is different from the other algorithms;
    collecting, by the at least one computing device and from the user devices, marketing data describing user interactions with the different digital content items;
    determining, by the at least one computing device, measures of achievement of the desired action for the different digital content items based on the marketing data;
    calculating, by the at least one computing device, measures of the statistical guarantee that indicate accuracy of the measures of achievement;
    responsive to a determination that the condition defining the test end has not occurred, generating, by the at least one computing device, optimized delivery allocation data by applying the selected allocation optimization algorithm, the optimized delivery allocation data indicating numbers of the different digital content items to deliver to the user devices; and
    delivering, by the at least one computing device, the collection of digital content to the user devices according to the optimized delivery allocation data.

2. The method as described in claim 1, wherein the condition defines the test end as a fixed duration of the test.

3. The method as described in claim 2, wherein the condition corresponds to one of:
    a specified number of deliveries of the digital content of the collection;
    a specified amount of time; or
    a specified budget for delivering the digital content of the collection to the user devices.

4. The method as described in claim 1, wherein the condition defines the test end to have an unknown duration.

5. The method as described in claim 4, wherein the condition defining the test end corresponds to the measures of statistical guarantee achieving a threshold measure.

6. The method as described in claim 5, further comprising determining whether the condition defining the test end has occurred based on a comparison of the calculated measures of statistical guarantee to the threshold measure.

7. The method as described in claim 1, further comprising, after delivering the collection of digital content according to the optimized delivery allocation data and until a determination that the condition defining the test end occurs, iteratively performing the collecting, determining, calculating, generating, and delivering according to the optimized delivery allocation data.

8. The method as described in claim 1, further comprising identifying the digital content of the collection that achieves the desired action based, in part, on the measures of achievement.

9. The method as described in claim 1, further comprising responsive to a determination that the condition defining the test end has occurred, identifying the digital content of the collection that achieves the desired action based, in part, on the measures of achievement.

10. The method as described in claim 1, further comprising generating digital content for output that indicates the digital content of the collection that is identified as achieving the desired action based on the measures of achievement.

11. The method as described in claim 1, wherein the digital content identified as achieving the desired action achieves the desired action at a higher rate than other digital content of the collection.

12. The method as described in claim 1, wherein the digital content identified as achieving the desired action achieves the desired action at a highest rate of the digital content in the collection.

13. The method as described in claim 1, further comprising ranking the different digital content items, one said item to another, according to the measures of achievement.

14. The method as described in claim 1, wherein the conditions defining the test end correspond to fixed durations or unknown durations and the types of statistical guarantees comprise confidence intervals and t-scores.

15. The method as described in claim 14, wherein the plurality of allocation optimization algorithms include at least one of:
    a first allocation optimization algorithm used in connection with a first combination where the condition defining the test end corresponds to a fixed duration and the type of statistical guarantee comprises the confidence intervals;
    a second allocation optimization algorithm used in connection with a second combination where the condition defining the test end corresponds to a fixed duration and the type of statistical guarantee comprises the t-scores;
    a third allocation optimization algorithm used in connection with a third combination where the condition defining the test end corresponds to an unknown duration and the type of statistical guarantee comprises the confidence intervals; and
    a fourth allocation optimization algorithm used in connection with a fourth combination where the condition defining the test end corresponds to an unknown duration and the type of statistical guarantee comprises the t-scores.

16. A system comprising:
    a testing module implemented at least partially in hardware of at least one computing device to determine measures of achievement for different digital content items of a collection to achieve a desired action, the testing module further implemented to calculate measures of statistical guarantee for the measures of achievement, the measures of achievement determined based on collected marketing data that describes user interaction with the different digital content items;
    an optimization algorithm selection module implemented at least partially in hardware of at least one computing device to select one of a plurality of allocation optimization algorithms for use in connection with identifying a digital content item of the collection that achieves the desired action, the plurality of allocation optimization algorithms each being used in connection a combination of conditions defining an end of an identification test and types of statistical guarantees that is different from the other algorithms, and the selected allocation optimization algorithm selected based on a particular condition defining the end of the identification test and a particular type of statistical guarantee associated with the identification test;
    a content allocation module implemented at least partially in hardware of at least one computing device to compute an optimized allocation of the different digital content items of the collection for delivery using the selected allocation optimization algorithm: and
    a delivery module implemented at least partially in hardware of at least one computing device to deliver the different digital content items of the collection according to the optimized allocation.

17. The system as described in claim 16, wherein the plurality of allocation optimization algorithms includes at least one of:
    a first allocation optimization algorithm used in connection with a first combination where the particular condition corresponds to a fixed duration and the particular type of statistical guarantee comprises confidence intervals;
    a second allocation optimization algorithm used in connection with a second combination where the particular condition corresponds to a fixed duration and the particular type of statistical guarantee comprises t-scores;
    a third allocation optimization algorithm used in connection with a third combination where the particular condition corresponds to an unknown duration and the particular type of statistical guarantee comprises confidence intervals; and
    a fourth allocation optimization algorithm used in connection with a second combination where the particular condition corresponds to an unknown duration and the particular type of statistical guarantee comprises t-scores.

18. In a digital medium environment to identify digital content of a collection of different digital content that achieves a desired action, a method implemented by at least one computing device, the method comprising:
    iteratively delivering, by the at least one computing device, the digital content of the collection according to an optimized allocation that describes numbers of each different digital content item of the collection to deliver to user devices, the optimized allocation determined using one of a plurality of allocation optimization algorithms selected based on a condition defining an end of an identification test and a type of statistical guarantee associated with the identification test, each algorithm of the plurality of allocation optimization algorithms being used in connection with a combination's of conditions defining the end of the identification test and types of statistical guarantees that is different from the other algorithms;
    identifying, by the at least one computing device, the digital content of the collection that achieves the desired action at a higher rate than other content of the collection based on the iteratively delivering; and
    presenting, via an action achievement interface, information indicative of identified digital content from the collection.

19. The method as described in claim 18, wherein the condition defines the end as a fixed duration of the test.

20. The method as described in claim 18, wherein the condition defines the end to have an unknown duration, and the condition corresponds to the statistical guarantee satisfying a threshold measure.

* * * * *

UNITED STATES PATENT AND TRADEMARK OFFICE
CERTIFICATE OF CORRECTION

PATENT NO. : 10,853,840 B2
APPLICATION NO. : 15/667558
DATED : December 1, 2020
INVENTOR(S) : Kourosh Modarresi and Khashayar Khosravi It is certified that error appears in the above-identified patent and that said Letters Patent is hereby corrected as shown below:

In the Claims

Column 26, Line 10, in Claim 1, after "connection with a", delete "combination's", insert -- combination --, therefor.

Column 28, Line 48, in Claim 18, after "connection with a", delete "combination's", insert -- combination --, therefor.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*